United States Patent
Paquette et al.

(10) Patent No.: US 12,556,566 B2
(45) Date of Patent: Feb. 17, 2026

(54) SYSTEMS AND METHODS FOR DYNAMIC VULNERABILITY SCORING

(71) Applicant: Secureworks Corp., Wilmington, DE (US)

(72) Inventors: Serge-Olivier Paquette, Montreal (CA); Pierre-David Oriol, Montreal (CA)

(73) Assignee: Secureworks Corp., Dallas, TX (US)

( * ) Notice: Subject to any disclaimer, the term of this patent is extended or adjusted under 35 U.S.C. 154(b) by 374 days.

(21) Appl. No.: 17/741,943

(22) Filed: May 11, 2022

(65) Prior Publication Data
US 2023/0370486 A1 Nov. 16, 2023

(51) Int. Cl.
*H04L 9/40* (2022.01)

(52) U.S. Cl.
CPC ................ *H04L 63/1433* (2013.01)

(58) Field of Classification Search
CPC .................................................. H04L 63/1433
See application file for complete search history.

(56) References Cited

U.S. PATENT DOCUMENTS

| | | |
|---|---|---|
| 5,937,066 A | 8/1999 | Gennaro et al. |
| 6,357,010 B1 | 3/2002 | Viets et al. |
| 7,269,578 B2 | 9/2007 | Sweeney |
| 7,331,061 B1 | 2/2008 | Ramsey et al. |
| 7,492,957 B1 | 2/2009 | Bonhaus et al. |
| 7,548,932 B2 | 6/2009 | Horvitz et al. |
| 7,555,482 B2 | 6/2009 | Korkus |
| 7,571,474 B2 | 8/2009 | Ross et al. |

(Continued)

FOREIGN PATENT DOCUMENTS

| | | |
|---|---|---|
| EP | 3599753 A1 | 1/2020 |
| RU | 2738344 C1 | 12/2020 |

(Continued)

OTHER PUBLICATIONS

Buyukkayhan, Ahmet Sali; Oprea, Alina; Li, Zhou; and Robertson, William; "*Lens on the endpoint; Hunting for malicious software through endpoint data analysis*"; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.

(Continued)

*Primary Examiner* — Shewaye Gelagay
*Assistant Examiner* — Thomas A Carnes
(74) *Attorney, Agent, or Firm* — IP Spring

(57) ABSTRACT

The present disclosure provides systems and methods for substantially continuous and dynamic vulnerability scoring. According to the present disclosure, the method includes detecting one or more vulnerabilities. The method includes determining a contextual prioritization score (CPS) for each of the one or more vulnerabilities based on historical data, the historical data including a series of contextual features corresponding to each one of the one or more vulnerabilities. The method may include, in response to detection of an event, determining a partial CPS score by an agent. The method may include, if a new partial CPS is determined, generating an updated CPS based on the CPS and the new partial CPS and transmitting the updated CPS to each of one or more computing devices.

20 Claims, 8 Drawing Sheets

(56) References Cited

U.S. PATENT DOCUMENTS

| | | |
|---|---|---|
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,841,008 B1 | 11/2010 | Cole |
| 7,856,411 B2 | 12/2010 | Darr |
| 7,926,113 B1 | 4/2011 | Gula et al. |
| 8,037,529 B1 | 10/2011 | Chiueh |
| 8,079,081 B1 | 12/2011 | Lavrik et al. |
| 8,082,506 B1 | 12/2011 | McConnell |
| 8,122,495 B2 | 2/2012 | Ramsey et al. |
| 8,156,553 B1 | 4/2012 | Church et al. |
| 8,327,419 B1 | 12/2012 | Korablev et al. |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,793,786 B2 | 7/2014 | Bhesania et al. |
| 8,805,881 B2 | 8/2014 | Hom et al. |
| 8,832,048 B2 | 9/2014 | Lim |
| 8,839,414 B2 | 9/2014 | Mantle et al. |
| 8,898,777 B1 | 11/2014 | Oliver |
| 8,909,673 B2 | 12/2014 | Faitelson et al. |
| 8,928,476 B2 | 1/2015 | Jerhotova et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 9,046,886 B2 | 6/2015 | Chong et al. |
| 9,047,336 B2 | 6/2015 | Hom et al. |
| 9,058,492 B1 | 6/2015 | Satish |
| 9,069,599 B2 | 6/2015 | Martinez et al. |
| 9,098,702 B2 | 8/2015 | Rubin et al. |
| 9,129,105 B2 | 9/2015 | Donley et al. |
| 9,130,988 B2 | 9/2015 | Seifert et al. |
| 9,137,262 B2 | 9/2015 | Qureshi et al. |
| 9,191,400 B1 | 11/2015 | Ptasinski et al. |
| 9,195,809 B1 | 11/2015 | Kaplan |
| 9,275,231 B1 | 3/2016 | Chen |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,438,623 B1 | 9/2016 | Thioux |
| 9,519,756 B2 | 12/2016 | Bitran et al. |
| 9,544,273 B2 | 1/2017 | Fleury et al. |
| 9,548,994 B2 | 1/2017 | Pearcy et al. |
| 9,558,352 B1 | 1/2017 | Dennison et al. |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,690,938 B1 | 6/2017 | Saxe et al. |
| 9,692,778 B1 * | 6/2017 | Mohanty ............. G06F 9/45533 |
| 9,710,672 B2 | 7/2017 | Braun |
| 9,712,549 B2 | 7/2017 | Almurayh |
| 9,742,559 B2 | 8/2017 | Christodorescu et al. |
| 9,767,302 B2 | 9/2017 | Lim |
| 9,792,443 B1 | 10/2017 | Sheridan |
| 9,805,202 B2 | 10/2017 | Medeiros et al. |
| 9,825,989 B1 | 11/2017 | Mehra |
| 9,910,986 B1 | 3/2018 | Saxe et al. |
| 9,934,376 B1 | 4/2018 | Ismael |
| 9,973,524 B2 | 5/2018 | Boyer et al. |
| 9,998,480 B1 | 6/2018 | Gates |
| 10,038,706 B2 | 7/2018 | Mekky |
| 10,050,992 B2 | 8/2018 | Thyni et al. |
| 10,063,582 B1 | 8/2018 | Feng et al. |
| 10,114,954 B1 | 10/2018 | Bellis |
| 10,116,500 B1 | 10/2018 | Long et al. |
| 10,218,733 B1 | 2/2019 | Amidon |
| 10,270,790 B1 | 4/2019 | Jackson |
| 10,277,625 B1 | 4/2019 | Efstathopoulos |
| 10,311,231 B1 | 6/2019 | Kayyoor et al. |
| 10,348,747 B2 | 7/2019 | Yamada |
| 10,356,125 B2 | 7/2019 | Goutal et al. |
| 10,382,473 B1 | 8/2019 | Ashkenazy |
| 10,382,489 B2 | 8/2019 | Das et al. |
| 10,419,903 B2 | 9/2019 | Singh et al. |
| 10,425,223 B2 | 9/2019 | Roth et al. |
| 10,454,950 B1 | 10/2019 | Aziz |
| 10,474,813 B1 | 11/2019 | Ismael |
| 10,474,820 B2 | 11/2019 | Manadhata |
| 10,491,632 B1 | 11/2019 | Natarajan et al. |
| 10,521,584 B1 | 12/2019 | Sharifi Mehr |
| 10,558,809 B1 | 2/2020 | Joyce |
| 10,567,407 B2 | 2/2020 | Tang et al. |
| 10,594,713 B2 | 3/2020 | McLean |
| 10,601,865 B1 | 3/2020 | Mesdaq et al. |
| 10,630,703 B1 * | 4/2020 | Ghosh ................ H04L 63/1408 |
| 10,642,753 B1 | 5/2020 | Steinberg |
| 10,691,810 B1 | 6/2020 | Freitag |
| 10,726,127 B1 | 7/2020 | Steinberg |
| 10,728,263 B1 | 7/2020 | Neumann |
| 10,735,470 B2 | 8/2020 | Vidas et al. |
| 10,754,958 B1 | 8/2020 | Sidagni |
| 10,762,206 B2 | 9/2020 | Titonis et al. |
| 10,785,238 B2 | 9/2020 | McLean et al. |
| 10,834,128 B1 | 11/2020 | Rajogopalan et al. |
| 10,841,337 B2 | 11/2020 | Kinder |
| 10,853,431 B1 | 12/2020 | Lin et al. |
| 10,855,717 B1 | 12/2020 | Feiman |
| 10,868,825 B1 | 12/2020 | Dominessy |
| 10,915,828 B2 | 2/2021 | Qhi |
| 10,944,758 B1 | 3/2021 | Nagargadde |
| 10,986,144 B1 | 4/2021 | Lee |
| 11,003,718 B2 | 5/2021 | McLean et al. |
| 11,038,920 B1 | 6/2021 | Sellers |
| 11,044,263 B2 | 6/2021 | McLean et al. |
| 11,113,086 B1 | 9/2021 | Steinberg |
| 11,140,193 B2 | 10/2021 | Patel |
| 11,165,862 B2 | 11/2021 | Austin et al. |
| 11,275,831 B1 | 3/2022 | Aouad et al. |
| 11,310,268 B2 | 4/2022 | Bowditch et al. |
| 11,552,979 B1 | 1/2023 | Soudhamma |
| 11,562,076 B2 | 1/2023 | El-Moussa |
| 11,693,972 B2 | 7/2023 | Nunes |
| 11,757,907 B1 | 9/2023 | Berger |
| 11,863,577 B1 | 1/2024 | Miseiko |
| 2002/0129135 A1 | 9/2002 | Delany et al. |
| 2002/0199122 A1 | 12/2002 | Davis |
| 2004/0128543 A1 | 7/2004 | Blake |
| 2005/0015382 A1 | 1/2005 | Aaron |
| 2005/0060295 A1 | 3/2005 | Gould et al. |
| 2005/0138204 A1 | 6/2005 | Iyer et al. |
| 2005/0138413 A1 | 6/2005 | Lippmann |
| 2005/0166072 A1 | 7/2005 | Converse |
| 2005/0288939 A1 | 12/2005 | Peled et al. |
| 2006/0012815 A1 | 1/2006 | Ebner et al. |
| 2006/0021046 A1 | 1/2006 | Cook |
| 2006/0021048 A1 | 1/2006 | Cook |
| 2006/0037076 A1 | 2/2006 | Roy |
| 2006/0195575 A1 | 8/2006 | Delany et al. |
| 2006/0253447 A1 | 11/2006 | Judge |
| 2007/0067848 A1 | 3/2007 | Gustave |
| 2007/0143852 A1 | 6/2007 | Keanini |
| 2007/0169199 A1 | 7/2007 | Quinnell |
| 2007/0192867 A1 | 8/2007 | Miliefsky |
| 2007/0226248 A1 | 9/2007 | Darr |
| 2007/0226807 A1 | 9/2007 | Ginter et al. |
| 2007/0294756 A1 | 12/2007 | Fetik |
| 2008/0077593 A1 | 3/2008 | Abrams et al. |
| 2008/0219334 A1 | 9/2008 | Brainos et al. |

(56) References Cited

U.S. PATENT DOCUMENTS

| | | |
|---|---|---|
| 2008/0255997 A1 | 10/2008 | Bluhm et al. |
| 2008/0262991 A1 | 10/2008 | Kapoor et al. |
| 2008/0301798 A1 | 12/2008 | Hao |
| 2008/0320000 A1 | 12/2008 | Gaddam |
| 2009/0038015 A1 | 2/2009 | Diamant |
| 2009/0113550 A1 | 4/2009 | Costa |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2010/0251329 A1 | 9/2010 | Wei et al. |
| 2011/0004771 A1 | 1/2011 | Matsushima et al. |
| 2011/0179492 A1 | 7/2011 | Markopoulou et al. |
| 2011/0197056 A1 | 8/2011 | Chen |
| 2011/0276604 A1 | 11/2011 | Hom et al. |
| 2011/0276716 A1 | 11/2011 | Coulson et al. |
| 2012/0072983 A1 | 3/2012 | McCusker et al. |
| 2012/0117640 A1 | 5/2012 | Ramsey et al. |
| 2012/0151594 A1 | 6/2012 | McClure et al. |
| 2012/0185275 A1 | 7/2012 | Loghmani |
| 2012/0222122 A1 | 8/2012 | Das |
| 2012/0233699 A1 | 9/2012 | Jajodia |
| 2012/0246730 A1 | 9/2012 | Raad |
| 2012/0254333 A1 | 10/2012 | Chandramouli et al. |
| 2012/0260341 A1 | 10/2012 | Chan et al. |
| 2013/0074188 A1 | 3/2013 | Giakouminakis et al. |
| 2013/0104191 A1 | 4/2013 | Peled et al. |
| 2013/0138428 A1 | 5/2013 | Chandramouli et al. |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko et al. |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0047545 A1 | 2/2014 | Sidagni |
| 2014/0051432 A1 | 2/2014 | Gupta et al. |
| 2014/0137257 A1 | 5/2014 | Martinez |
| 2014/0143863 A1 | 5/2014 | Deb et al. |
| 2014/0165195 A1 | 6/2014 | Brdiczka et al. |
| 2014/0165204 A1 | 6/2014 | Williams |
| 2014/0181981 A1 | 6/2014 | Christodorescu |
| 2014/0215629 A1* | 7/2014 | Raz .................. G06F 21/577 |
| | | 726/25 |
| 2014/0222712 A1 | 8/2014 | Samaha et al. |
| 2014/0223555 A1 | 8/2014 | Sanz Hernando et al. |
| 2014/0283081 A1 | 9/2014 | Sheridan |
| 2014/0283083 A1 | 9/2014 | Gula |
| 2014/0331207 A1 | 11/2014 | Sridharan |
| 2014/0373151 A1 | 12/2014 | Webb et al. |
| 2015/0019323 A1 | 1/2015 | Goldberg et al. |
| 2015/0040225 A1 | 2/2015 | Coates et al. |
| 2015/0074390 A1 | 3/2015 | Stoback et al. |
| 2015/0135287 A1 | 5/2015 | Medeiros et al. |
| 2015/0135320 A1 | 5/2015 | Coskun |
| 2015/0156212 A1 | 6/2015 | Khatri et al. |
| 2015/0186618 A1 | 7/2015 | Poorvin et al. |
| 2015/0222652 A1 | 8/2015 | Ramsey et al. |
| 2015/0271047 A1 | 9/2015 | McLean |
| 2015/0310211 A1 | 10/2015 | Mei et al. |
| 2015/0324457 A1 | 11/2015 | McLean |
| 2015/0332054 A1 | 11/2015 | Eck |
| 2015/0365437 A1 | 12/2015 | Bell, Jr. |
| 2016/0006749 A1 | 1/2016 | Cohen et al. |
| 2016/0014140 A1 | 1/2016 | Akireddy et al. |
| 2016/0014151 A1 | 1/2016 | Prakash |
| 2016/0078365 A1 | 3/2016 | Baumard |
| 2016/0099963 A1 | 4/2016 | Mahaffey et al. |
| 2016/0112445 A1 | 4/2016 | Abramowitz |
| 2016/0134653 A1 | 5/2016 | Vallone |
| 2016/0139886 A1 | 5/2016 | Perdriau et al. |
| 2016/0156655 A1 | 6/2016 | Lotem et al. |
| 2016/0162690 A1 | 6/2016 | Reith |
| 2016/0182546 A1 | 6/2016 | Coates et al. |
| 2016/0205127 A1 | 7/2016 | Roehl |
| 2016/0241591 A1 | 8/2016 | Ramsey et al. |
| 2016/0248789 A1 | 8/2016 | Nakamatsu |
| 2016/0253497 A1 | 9/2016 | Christodorescu |
| 2016/0277423 A1 | 9/2016 | Apostolescu et al. |
| 2016/0313709 A1 | 10/2016 | Biesdorf et al. |
| 2016/0337400 A1 | 11/2016 | Gupta |
| 2016/0342805 A1 | 11/2016 | Lim |
| 2016/0378978 A1 | 12/2016 | Singla et al. |
| 2017/0026343 A1 | 1/2017 | Wardman |
| 2017/0026391 A1 | 1/2017 | Abu-Nimeh |
| 2017/0063893 A1 | 3/2017 | Franc et al. |
| 2017/0063905 A1 | 3/2017 | Muddu et al. |
| 2017/0093902 A1 | 3/2017 | Roundy et al. |
| 2017/0098087 A1 | 4/2017 | Li |
| 2017/0111379 A1 | 4/2017 | Khatri et al. |
| 2017/0111384 A1 | 4/2017 | Loureiro |
| 2017/0126710 A1 | 5/2017 | De-Levie |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0180418 A1 | 6/2017 | Shen et al. |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0208084 A1 | 7/2017 | Steelman et al. |
| 2017/0208085 A1 | 7/2017 | Steelman et al. |
| 2017/0243004 A1 | 8/2017 | Kinder et al. |
| 2017/0243005 A1 | 8/2017 | Kinder et al. |
| 2017/0243009 A1 | 8/2017 | Sejpal |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0318033 A1 | 11/2017 | Holland et al. |
| 2017/0318034 A1 | 11/2017 | Holland et al. |
| 2017/0346839 A1 | 11/2017 | Peppe |
| 2017/0359368 A1 | 12/2017 | Hodgman et al. |
| 2018/0004948 A1 | 1/2018 | Martin |
| 2018/0069885 A1 | 3/2018 | Patterson |
| 2018/0077189 A1 | 3/2018 | Doppke et al. |
| 2018/0077195 A1 | 3/2018 | Gathala |
| 2018/0089574 A1 | 3/2018 | Goto |
| 2018/0091306 A1 | 3/2018 | Antonopoulos et al. |
| 2018/0096140 A1 | 4/2018 | Bulygin |
| 2018/0103010 A1 | 4/2018 | Diaz Cuellar et al. |
| 2018/0124073 A1 | 5/2018 | Scherman et al. |
| 2018/0124085 A1 | 5/2018 | Frayman et al. |
| 2018/0124092 A1 | 5/2018 | Pope |
| 2018/0124094 A1* | 5/2018 | Hamdi .................. G06F 7/24 |
| 2018/0129811 A1 | 5/2018 | Diu |
| 2018/0152480 A1 | 5/2018 | Kinder et al. |
| 2018/0181599 A1 | 6/2018 | Crabtree et al. |
| 2018/0219899 A1 | 8/2018 | Joy |
| 2018/0234434 A1 | 8/2018 | Viljoen |
| 2018/0270126 A1 | 9/2018 | Tapia |
| 2018/0288198 A1 | 10/2018 | Pope et al. |
| 2018/0324203 A1 | 11/2018 | Estes |
| 2018/0367550 A1 | 12/2018 | Musuvathi et al. |
| 2019/0014149 A1 | 1/2019 | Cleveland et al. |
| 2019/0037406 A1 | 1/2019 | Wash |
| 2019/0050554 A1 | 2/2019 | Fiske |
| 2019/0052663 A1* | 2/2019 | Lee .................. H04L 63/20 |
| 2019/0068630 A1 | 2/2019 | Valecha et al. |
| 2019/0095320 A1 | 3/2019 | Biswas et al. |
| 2019/0095801 A1 | 3/2019 | Saillet et al. |
| 2019/0102554 A1 | 4/2019 | Luo et al. |
| 2019/0102564 A1 | 4/2019 | Li |
| 2019/0102646 A1 | 4/2019 | Redmon et al. |
| 2019/0104154 A1 | 4/2019 | Kumar et al. |
| 2019/0109717 A1 | 4/2019 | Reddy et al. |
| 2019/0122258 A1 | 4/2019 | Bramberger et al. |
| 2019/0132344 A1 | 5/2019 | Lem et al. |
| 2019/0166149 A1 | 5/2019 | Gerrick |
| 2019/0166152 A1 | 5/2019 | Steele |
| 2019/0173919 A1 | 6/2019 | Irimie et al. |
| 2019/0242718 A1 | 8/2019 | Siskind et al. |
| 2019/0258807 A1 | 8/2019 | DiMaggio et al. |

(56) References Cited

U.S. PATENT DOCUMENTS

| | | |
|---|---|---|
| 2019/0297096 A1 | 9/2019 | Ahmed et al. |
| 2019/0342296 A1 | 11/2019 | Anandam et al. |
| 2019/0347423 A1 | 11/2019 | Sanossian |
| 2019/0347433 A1 | 11/2019 | Chakravorty et al. |
| 2019/0370472 A1 | 12/2019 | Hodgman |
| 2020/0012796 A1 | 1/2020 | Trepagnieer |
| 2020/0036750 A1 | 1/2020 | Bahnsen et al. |
| 2020/0036751 A1 | 1/2020 | Kohavi |
| 2020/0057857 A1 | 2/2020 | Roytman |
| 2020/0067980 A1 | 2/2020 | Livny |
| 2020/0074084 A1 | 3/2020 | Dorrans |
| 2020/0082080 A1 | 3/2020 | Boulton |
| 2020/0097662 A1 | 3/2020 | Hufsmith |
| 2020/0097663 A1 | 3/2020 | Sato |
| 2020/0110873 A1 | 4/2020 | Rosendahl |
| 2020/0120126 A1 | 4/2020 | Ocepek |
| 2020/0159525 A1 | 5/2020 | Bhalla |
| 2020/0177618 A1 | 6/2020 | Hassanzadeh |
| 2020/0186544 A1 | 6/2020 | Dichiu et al. |
| 2020/0186569 A1 | 6/2020 | Milazzo |
| 2020/0195683 A1 | 6/2020 | Kuppa et al. |
| 2020/0210590 A1 | 7/2020 | Doyle |
| 2020/0213346 A1 | 7/2020 | Shafet |
| 2020/0257792 A1 | 8/2020 | Rivard |
| 2020/0259791 A1 | 8/2020 | Mundilla Garcia et al. |
| 2020/0274894 A1 | 8/2020 | Argoeti et al. |
| 2020/0285737 A1 | 9/2020 | Kraus |
| 2020/0285952 A1 | 9/2020 | Liu et al. |
| 2020/0314122 A1 | 10/2020 | Jones et al. |
| 2020/0327237 A1 | 10/2020 | Shakarian |
| 2020/0329062 A1 | 10/2020 | Beauchesne |
| 2020/0336497 A1 | 10/2020 | Seul et al. |
| 2020/0351285 A1 | 11/2020 | Eisenkot et al. |
| 2020/0351302 A1 | 11/2020 | Kyle et al. |
| 2020/0351307 A1 | 11/2020 | Vidas et al. |
| 2020/0356665 A1 | 11/2020 | Denney et al. |
| 2020/0358795 A1 | 11/2020 | Urbanski et al. |
| 2020/0364338 A1 | 11/2020 | Ducau et al. |
| 2020/0372129 A1 | 11/2020 | Gupta |
| 2020/0372154 A1 | 11/2020 | Bacher et al. |
| 2020/0380119 A1 | 12/2020 | Correa Bahnsen et al. |
| 2020/0389472 A1 | 12/2020 | Drapeau |
| 2020/0394309 A1 | 12/2020 | Angelo et al. |
| 2021/0006575 A1 | 1/2021 | McLean et al. |
| 2021/0012012 A1 | 1/2021 | Soroush |
| 2021/0034752 A1 | 2/2021 | Canada |
| 2021/0034753 A1 | 2/2021 | Canada |
| 2021/0034895 A1 | 2/2021 | Archibald |
| 2021/0037055 A1 | 2/2021 | Dumont et al. |
| 2021/0067562 A1 | 3/2021 | Kinder et al. |
| 2021/0075814 A1* | 3/2021 | Bulut ............... H04L 63/1433 |
| 2021/0103663 A1 | 4/2021 | Gadhe |
| 2021/0109797 A1 | 4/2021 | Zhou |
| 2021/0112078 A1 | 4/2021 | Huston, III |
| 2021/0112087 A1 | 4/2021 | Tassoumt |
| 2021/0112090 A1 | 4/2021 | Rivera et al. |
| 2021/0133320 A1 | 5/2021 | Havenga |
| 2021/0157926 A1 | 5/2021 | Handurukande |
| 2021/0157945 A1 | 5/2021 | Cobb |
| 2021/0160273 A1 | 5/2021 | Choi |
| 2021/0173930 A1 | 6/2021 | Dahal |
| 2021/0173935 A1 | 6/2021 | Ramasamy |
| 2021/0185057 A1 | 6/2021 | McLean |
| 2021/0192057 A1 | 6/2021 | Helfman |
| 2021/0194853 A1 | 6/2021 | Xiao |
| 2021/0200840 A1 | 7/2021 | Kannan |
| 2021/0211450 A1* | 7/2021 | Aleidan ............... H04L 63/1416 |
| 2021/0216928 A1 | 7/2021 | O'Toole |
| 2021/0226926 A1 | 7/2021 | Crabtree |
| 2021/0226970 A1 | 7/2021 | Ross et al. |
| 2021/0226982 A1 | 7/2021 | Marty |
| 2021/0226983 A1 | 7/2021 | Cunningham |
| 2021/0256113 A1 | 8/2021 | Stott et al. |
| 2021/0258327 A1 | 8/2021 | Felke et al. |
| 2021/0273957 A1 | 9/2021 | Boyer |
| 2021/0281609 A1 | 9/2021 | Crabtree |
| 2021/0306372 A1 | 9/2021 | Koral |
| 2021/0312058 A1 | 10/2021 | Chiarelli |
| 2021/0312351 A1 | 10/2021 | Pourmohammad |
| 2021/0342441 A1 | 11/2021 | Ross |
| 2021/0342450 A1* | 11/2021 | Patel ............... G06F 21/577 |
| 2021/0360007 A1 | 11/2021 | Paquin |
| 2021/0367961 A1 | 11/2021 | Kuppa |
| 2021/0390181 A1 | 12/2021 | McClay |
| 2022/0004643 A1 | 1/2022 | Sloane |
| 2022/0006818 A1 | 1/2022 | Cunningham |
| 2022/0014542 A1 | 1/2022 | Janakiraman |
| 2022/0021691 A1 | 1/2022 | Bhatkar |
| 2022/0038424 A1 | 2/2022 | Liu et al. |
| 2022/0043911 A1 | 2/2022 | Pomerantsev |
| 2022/0070182 A1 | 3/2022 | Bowditch et al. |
| 2022/0070193 A1 | 3/2022 | Konda et al. |
| 2022/0070279 A1 | 3/2022 | Pang |
| 2022/0078203 A1 | 3/2022 | Shakarian |
| 2022/0083644 A1 | 3/2022 | Kulshreshtha |
| 2022/0100868 A1 | 3/2022 | Tarrant |
| 2022/0101326 A1 | 3/2022 | Kim et al. |
| 2022/0159033 A1 | 5/2022 | Mizrahi |
| 2022/0174077 A1 | 6/2022 | Sel |
| 2022/0179908 A1 | 6/2022 | Wei |
| 2022/0191230 A1 | 6/2022 | Morgan |
| 2022/0206819 A1 | 6/2022 | Pokam |
| 2022/0210168 A1 | 6/2022 | Yavo |
| 2022/0210656 A1 | 6/2022 | Shaw |
| 2022/0237764 A1 | 7/2022 | Mullet |
| 2022/0263850 A1 | 8/2022 | Colyandro, Jr. |
| 2022/0318625 A1* | 10/2022 | O'Toole ............... G06N 20/00 |
| 2022/0394034 A1 | 12/2022 | Keith |
| 2022/0400135 A1 | 12/2022 | Gamra |
| 2022/0407891 A1 | 12/2022 | Albanese |
| 2022/0414206 A1 | 12/2022 | Hinkle |
| 2023/0021226 A1 | 1/2023 | Bobrov |
| 2023/0021414 A1 | 1/2023 | Kumar |
| 2023/0038196 A1 | 2/2023 | Labreche |
| 2023/0105087 A1 | 4/2023 | Borges |
| 2023/0421578 A1 | 12/2023 | Mullins et al. |

FOREIGN PATENT DOCUMENTS

| | | |
|---|---|---|
| WO | WO2007/002749 A2 | 1/2007 |
| WO | WO2007/090605 A1 | 8/2007 |
| WO | WO2010/059843 A2 | 5/2010 |
| WO | WO2021/067238 A1 | 4/2021 |

OTHER PUBLICATIONS

Secureworks—Log Management—Protect your infrastructure from known and emerging threats; www.secureworks.com/resources/ds-log-management; 2015 (available).

Sofya Raskhodnikova & Adam Smith; CSE 598A Algorithmic Challenges in Data Privacy; Lecture 2; Jan. 19, 2010.

Afroz, S. and Greenstadt, R. "PhishZoo: Detecting Phishing Websites by Looking at Them"; IEEE Fifth International Conference on Semantic Computing, 2011; pp. 368-375; doi: 10.1109/ICSC.2011.52; 2011.

Alkhawlani, Mohammed, Elmogy, Mohammed and Elbakry, Hazem; "Content-based image retrieval using local features descriptors and bag-of-visual words"; International Journal of Advanced Computer Science and Applications, vol. 6 No. 9 2015; pp. 212-219; 2015.

Buber, E., Demir, O. and Sahingoz, O.K.; "Feature selections for the machine learning based detection of phishing websites"; 2017 International Artificial Intelligence and Data Processing Symposium (IDAP), 2017; pp. 1-5; doi: 10.1109/DAP.2017.8090317; 2017.

Lin, Tsung-Yi, et al.; "Microsoft coco: Common objects in context"; European Conference on Computer Vision, Springer, Cham, 2014; 2014.

Liu, Y., Wang, Q., Zhuang, M. and Zhu, Y.; Reengineering Legacy Systems with RESTFul Web Service; 2008 $32^{nd}$ Annual IEEE International Computer Software and Applications Conference, 2008; pp. 785-790; doi: 10.1109/COMPSAC.2008.89; 2008.

(56) References Cited

OTHER PUBLICATIONS

White, Joshua S., Matthews, Jeanna N., and Stacy, John L.; A method for the automated detection phishing websites through both site characteristics and image analysis Cyber Sensing 2012; vol. 8408; International Society for Optics and Photonics, 2012; 2012.
URLVoid; URLVoid.com; retrieved from archives.org: https: web.archive.org/web/20180730215132/https.://www.urlvoid.com/); Published Jul. 30, 2018.
International Search Report and the Written Opinion of the International Search Authority for PCT/US22/28780, mailed Sep. 12, 2022.
"Extended European Search Report in EP Application No. 22941829.8", Oct. 8, 2025, 11 pages.

* cited by examiner

SYSTEMS AND METHODS FOR DYNAMIC VULNERABILITY SCORING

TECHNICAL FIELD

This disclosure relates generally to scoring of security vulnerabilities and more particularly relates to systems and methods for dynamic vulnerability scoring of security system vulnerabilities via one or more agents and based on substantially continuous input of contextual data and for use of, the dynamic vulnerability scoring utilized to prioritize vulnerabilities.

BACKGROUND

Typically, computer network or system vulnerabilities are organized or classified based on the existing Common Vulnerability Scoring System (CVSS). Using the CVSS, a vulnerability is scored and ranked by either using the "base score" (e.g., a published score by, for example, the Common Vulnerabilities and Exposures (CVE) site), or by supplementing the "base score" using modifiers or scoring vectors of the CVSS. Supplementing the "base score" may attempt to capture the local context via environmental and temporal aspects of vulnerabilities. This approach is largely a manual operation conducted by hand by security experts in charge of understanding the local context that drives these vectors. Some automation may be utilized in the form of existing severity databases, although still requiring manual input and review by security experts. Additionally, some systems and methods may attempt to rank vulnerabilities using a level of exploitability, however, such systems use similar databases as the severity databases and still require manual input and/or past records.

Accordingly, it can be seen that a need exists for systems and methods directed to enabling enhanced, dynamic scoring of vulnerabilities. The present disclosure is directed to the foregoing and other related, and unrelated, problems/issues in the art.

SUMMARY

Briefly described, according to various aspects, the present disclosure is directed to systems and methods for dynamically scoring vulnerabilities in computer systems or networks having a plurality of information handling devices connected thereto. Such systems and methods may utilize a contextual vulnerability prioritization engine (CVP engine). The CVP engine may detect new and/or updated vulnerabilities present on a monitored computer network or security system. The CVP engine may scan various internal and/or external databases for vulnerabilities (e.g., such as a Common Vulnerabilities and Exposures (CVE) site or an internal vulnerability database), may wait until a user or computing devices transmits a vulnerability to the CVP engine, and/or may scan other sources of data to determine whether new or updated vulnerabilities are discovered. The CVP engine may scan for such vulnerabilities continuously, substantially continuously, or at pre-determined time intervals. Alternatively, or in addition to scanning for new vulnerabilities or a change/update to an existing vulnerability, the CVP engine, can be configured to wait until a new vulnerability or updated vulnerability is received from various sources (e.g., a computing device, user computing device, security specialist or expert, and/or an agent, etc.).

Upon discovering or detecting a new vulnerability, the CVP engine may utilize the CVSS score, in addition to historical data (e.g., historical contextual data and/or any other objective historical data), a plurality of contextual features related to the vulnerability, and/or a plurality of non-contextual features related to the vulnerability, to generate a contextual prioritization score (CPS). In such examples, the historical data may include the CVSS score, other data related to the CVSS score, and/or contextual and/or non-contextual data from one or more sources (e.g., computing devices such as switches, routers, servers, user device, etc.). The CVP engine may include one or more different agents, each agent corresponding to a type or set of data related to or identified with the vulnerability. For example, each agent may include or be comprised of one or more of a machine learning model or classifier, a statistical model, a probabilistic model, and/or various other models or classifiers. The data received by the CVP engine may be utilized by each corresponding agent associated therewith to generate partial CPS or risk scores that will be aggregated to generate/determine a dynamically updated to generate CPS for any new or updated vulnerability.

Further, the CVP engine may scan for or detect occurrences of events from one or more computing devices. Such scanning or detecting may occur continuously, substantially continuously, or at periodic time intervals. Upon detection of an event or occurrence of an event relating to or corresponding to a vulnerability, the CVP engine may direct or analyze received data type of subsets or portions thereof relating to the event through one or more of the agents corresponding to each data type of the received data relating to the event. Each of the agents may produce a partial risk score or CPS. The partial CPS may be utilized to adjust and/or update the previous CPS. The updated CPS may be transmitted to each of the one or more computing devices and utilized to prioritize known vulnerabilities.

In one aspect, the present disclosure provides a system for dynamically assessing and ranking security vulnerabilities of a network having a plurality of computing devices linked thereto. The system may include a contextual vulnerability prioritization engine, configured to detect one or more vulnerabilities present on the network. The contextual vulnerability prioritization engine may be configured to determine a contextual prioritization score (CPS) for each detected vulnerability based on an aggregation of a plurality of partial CPS' generated for each of a plurality of contextual features related to each detected vulnerability and a plurality of non-contextual features related to each vulnerability. The partial CPS' of each of the plurality of contextual features may be dynamically computed by a corresponding or associated agent of a plurality of agents based on the plurality of contextual features related to the vulnerability and the plurality of non-contextual features related to the vulnerability. The contextual vulnerability prioritization engine may be configured to scan for occurrences of events related to each identified/detected vulnerability, present on the network or any computing device connected thereto in response to detection of an occurrence of an event related to an identified/detected vulnerability present on one or more of the plurality of computing devices, directing data corresponding to the detected event related to the vulnerability to the corresponding agents of the plurality of agents. The contextual vulnerability prioritization engine also may be configured to determine, via each corresponding agent(s) receiving the data corresponding to the detected the event, a new partial CPS for each contextual feature applicable to the data generated from the occurrence of each detected event. The contextual vulnerability prioritization engine will be configured to determine an updated CPS representative of a present state of the identified/detected vulnerability based on each new partial CPS. The contextual vulnerability prioritization engine may be configured to transmit the updated CPS to each of the plurality of computing devices.

In embodiments, the agents can comprise one or more of trained classifiers, statistical models, or probabilistic models. The trained classifiers may be generated via another plurality of contextual features related to the vulnerability and another plurality of non-contextual features related to the vulnerability and one or more of a supervised machine learning algorithm or an unsupervised machine learning algorithm. The plurality of computing devices may include one or more of a switch, an access point, servers, storage devices, or user devices.

In another embodiment, the plurality of non-contextual features may include historical data of features such as a CVSS score related to the vulnerability. The plurality of contextual features may include one or more of a payload analysis, exploitation ease, detection reliability, threat intelligence, or vulnerability trends. Further, the plurality of contextual features may include one or more of exposure data, software and services affected by the vulnerability, behavioral analytics related to vulnerability, website content, scan frequency, a network attack surface, a pivotal potential, asset detection, or a remediation time prediction.

In some embodiments, the contextual vulnerability prioritization engine will further be configured to dynamically prioritize a plurality of vulnerabilities based on one or more dynamically updated CPS's for one or more vulnerabilities of the plurality of vulnerabilities. The partial CPS may be determined for each contextual feature and may be weighted based on a data type of the data corresponding to the occurrence of the event In another aspect, the present disclosure provides a method of dynamically scoring known, identified or detected vulnerabilities present on a network having a plurality of computing devices coupled thereto. The method may include detecting, via a contextual vulnerability prioritization engine, one of more vulnerabilities of one or more computing devices of the network. The method may include determining, via one or more agents of the contextual vulnerability prioritization engine, a contextual prioritization score (CPS) for each of the one or more known, identified or detected vulnerabilities based on historical data, the historical data including a series of contextual features corresponding to each one of the one or more known, identified or detected vulnerabilities. The method may include, in response to detection of an event related to one of the one or more known, identified or detected vulnerabilities on the one or more computing devices of the network, determining, for each of one or more received contextual features relating to the event, a partial CPS, wherein each partial CPS is dynamically determined by an agent of the one or more agents of the contextual vulnerability prioritization engine based on data related to the known, identified or detected vulnerability and an associated contextual entity relating to the vulnerability. The method also may include, if a new partial CPS is determined for at least one received contextual features (e.g. a change in the partial eps score of such a contextual feature changes), generating an updated CPS for the vulnerability based on the CPS and the new partial CPS and transmitting the updated CPS to each of the one or more computing devices.

In an embodiment, detection of each event may include vulnerability detection based on one or more of network mapping, vulnerability scanning, web application scanning, external sources, or threat intelligence. The detection of one or more occurrences of one or more events related to one of the one or more known, identified or detected vulnerabilities on the one or more computing devices may occur continuously, substantially continuously, or at periodic time intervals. A plurality of partial scores may be determined in parallel based on the detection of one or more occurrences of one or more events related to one of the one or more known, identified or detected vulnerabilities. Each of the plurality of partial scores may be weighted based on a data type or event type corresponding to the additional one or more occurrences of one or more events related to one of the one or more known, identified or detected vulnerabilities. The updated CPS may replace the current CPS.

According to another aspect, the present disclosure provides a non-transitory machine-readable storage medium storing processor-executable instructions. The instructions, when executed by at least one processor, may cause the at least one processor to detect one or more vulnerabilities of a plurality of computing devices. The instructions, when executed by at least one processor, may cause the at least one processor to determine, via one or more algorithms, a contextual prioritization score (CPS) for each one of the one or more vulnerabilities based on historical data corresponding to each one of one or more vulnerabilities. The historical data may include one or more contextual features, a CVSS score and/or other historical data. The instructions, when executed by at least one processor, may cause the at least one processor to detect occurrences of one or more events related to one of the one or more vulnerabilities on the plurality of computing devices. The instructions, when executed by at least one processor, may cause the at least one processor to receive one or more contextual features corresponding to detection of the occurrences of one or more events related to one of the one or more vulnerabilities on the plurality of computing devices. The instructions, when executed by at least one processor, also may cause the at least one processor to determine, via at least one of the one or more agents corresponding to a data type of one of the one or more contextual features corresponding to detection of the occurrences of one or more events related to one of the one or more vulnerabilities on the plurality of computing devices, a corresponding partial CPS. The instructions, when executed by at least one processor, may cause the at least one processor to generate an updated CPS based on the CPS and corresponding partial CPS. The instructions, when executed by at least one processor, may further cause the at least one processor to transmit the updated CPS to the plurality of computing devices.

In an embodiment, a plurality of partial CPS's may be determined in parallel or substantially parallel. Each of the one more vulnerabilities may be prioritized based on one of a CPS or, if determined, an updated CPS corresponding to each of the one or more vulnerabilities.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

Figure 1:
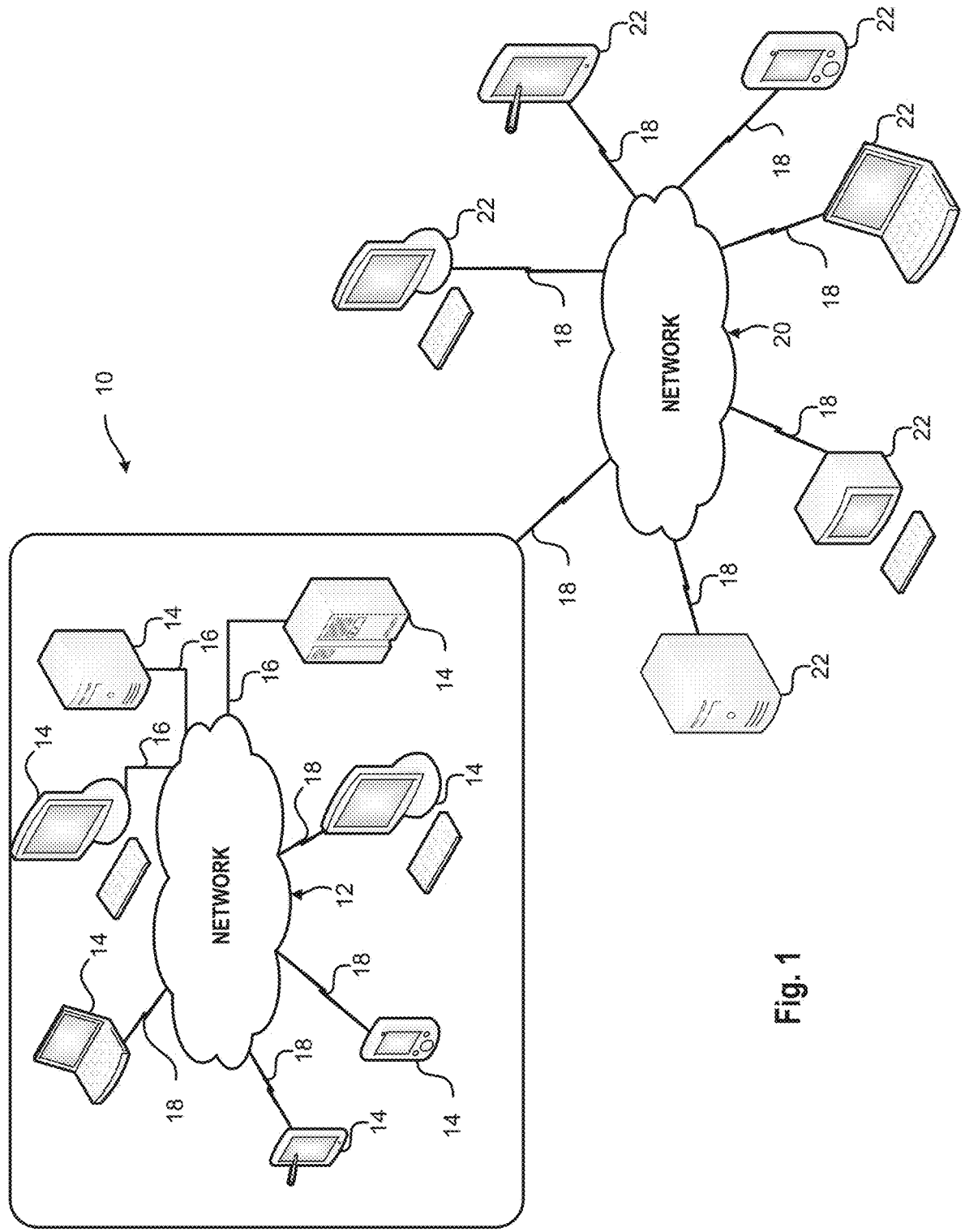
FIG. 1 is a schematic diagram of a data center including a networked system of information handling systems, according to one aspect of the present disclosure.

The following description in combination with the figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As shown in FIGS. 1-7, the present disclosure includes systems and methods for dynamically scoring security vulnerabilities known, identified, or detected to be present on a computer system or network having a plurality of computing devices or information managed devices connected thereto. By way of example, such vulnerabilities can include various known vulnerabilities relating to various software or hardware configurations and/or applications such as Common Vulnerabilities and Exposures (CVE's) that can be available in various databases and which have a known CVSS example. The system can include a contextual vulnerability prioritization engine (CVP) engine which may detect or scan for a new or updated vulnerability that may pose a threat to a particular computing device and/or to various aspects of the computing device. The CVP engine may detect or scan one or more different computing devices, networks, cloud computing networks or systems, containers or orchestrated sets of containers, and/or virtual computing devices. Alternatively, or in addition to detecting or scanning for new events, the CVP engine can also be informed of a new or updated vulnerability, e.g. from an outside source, and/or may wait until a new event is received, for example, via a computing device or user (e.g., via a user interface). Different vulnerabilities pose different levels of risk depending on assets exposed and/or computing devices impacted. As such, the CVP engine may determine, after detecting a new or updated vulnerability including varying types of data (e.g., historical data, contextual features or data, etc.), a contextual prioritized score (CPS).

To determine the CPS, the CVP engine may utilize received data from external sources (e.g. external from the system, such as external databases, National Vulnerability Database (NVD), Bugtraq, etc.) or internal sources (e.g., internal to the system, such as security specialists, internal databases or repositories, etc.). The CVP engine may utilize contextual features or data included in the data received to generate or determine the CPS. Further, each type of data received may be utilized to generate a part of or a partial CPS via a corresponding agent. The agent may include or may be a trained machine learning algorithm or classifier, a probabilistic model, a statistical model, or some other algorithm and/or model configured to determine or generate a part of or a partial CPS based on a type of data received. Further, each partial CPS may be weighted, based on the type of data. In other words, different data types may be determined to be more or less relevant in relation to an overall CPS than other data types.

After generation or determination of the CPS, the CVP engine may transmit the CPS and other relevant data indicating the vulnerability to connected computing devices. The computing devices may then execute varying instructions at varying times to generate events. The CVP engine may scan each of the computing devices for new events related to known identified or detected vulnerabilities. If an event is detected, the CVP engine may obtain data related to the event and utilize the data to generate a new part of or partial CPS via a corresponding one or more agent (e.g., the data type of the data indicating which one or more of the one or more agents to utilize).

Once a partial CPS is generated or determined, the CVP engine may incorporate the partial CPS into the previous CPS for the corresponding vulnerability. The events and generation of additional partial CPS's may occur a plurality of times over a selected or continuing period of time. For example, as new events are detected, such events may be utilized in the systems and methods for the length of time that the corresponding vulnerability impacts computing devices. In other words, once a solution has been determined to resolve, fix, neutralize, or otherwise prevent or minimize the effect of a vulnerability existing on the system, then events occurring in relation to such events can be stopped. The plurality of times that such a partial CPS may be determined, updated, and/or generated is not necessarily limited, and can be done each time an event is detected. Thus, a CPS for each known vulnerability is dynamically updated or computed, substantially continuously or periodically, over a prescribed period of time. Further, since contextual data is utilized to update the CPS, each vulnerability may be sorted based on actual impact to an organization or other entity. In other words, each vulnerability may be prioritized based on each vulnerabilities impact.

New CPS's for each vulnerability present on the computer system or network or one or more of the computing devices connected thereto may be updated or generated in real time. Further, the new CPS may be generated automatically, rather than via human or user interaction. Further still, generation of the new CPS is repeatable and mathematically sound, scalable (e.g., a plurality of new CPS's may be determined for a plurality of different vulnerabilities based on a plurality of received contextual data), fault tolerant, explainable, and granular. Finally, the new CPS takes into account likelihood and impact of different risks posed by each different contextual data.

FIG. 1 shows a block diagram of an exemplary data center 10 for which vulnerability scoring for new and updated vulnerabilities, in particular a contextual prioritized score (CPS), are generated and updated based on continuously, substantially continuously, or periodically received event data, including at least one contextual feature or data, related to a corresponding vulnerability. As shown in FIG. 1, the data center 10 can include a computer system or network 12 that may provide communications among a plurality of information handling systems 14 or computing devices, which can include work stations, personal computers, smart cellular telephones, personal digital assistants, laptop computers, servers, computing devices, virtual computing devices, containers or containerized devices, cloud computing based systems or devices, other suitable devices, and/or combinations thereof. The information handling systems 14 further can be coupled to the network 12 through wired line connections 16, wireless connections 18, or any other suitable lines of communication or connection.

As further shown in FIG. 1, the data center 10, and/or one or more of the information handling systems 14 thereof, can be communicatively coupled to a network, including a cloud based or other network as shown at 12 or 20 in FIG. 1, for example, through wired line connection 16, or through any other suitable connection, such as a wireless connection 18 (e.g., WiFi, cellular, etc.). The network 12 further can be accessible to/by one or more user or client managed information handling systems or devices 22 to facilitate communication between the client managed information handling systems 22 and the data center 10 for which system logs may be parsed and/or parsing scripts and/or rules may be generated by an event management center. The network 12 can include an API interface of the event management center, though the network can include any suitable network, such as the Internet or other wide area network, a local area network, or a combination of networks, and may provide communications, e.g., data communications, among the event management center and the client managed information handling systems 22.

The client managed information handling systems 22 can be connected to the network 20 through wired connections, e.g., an Ethernet cable, or other suitable wired or wireless connections 18, e.g., WiFi, Bluetooth®, cellular connections (e.g., 3G, 4G, LTE, 5G, etc.), other suitable wireless connections or combinations thereof (FIG. 1), to enable the clients or operators of information handling systems 22 to communicate with the event management center, e.g., to access one or more services provided thereby. For example, the event management center can be or include a web service.

For purposes of the present disclosure, the information handling systems 14/22 may include any computing device instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. In one embodiment, the information handling systems may include storage, such as random access memory (RAM) or (ROM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling systems also may include one or more buses operable to transmit communications between the various hardware components.

Figure 2A:
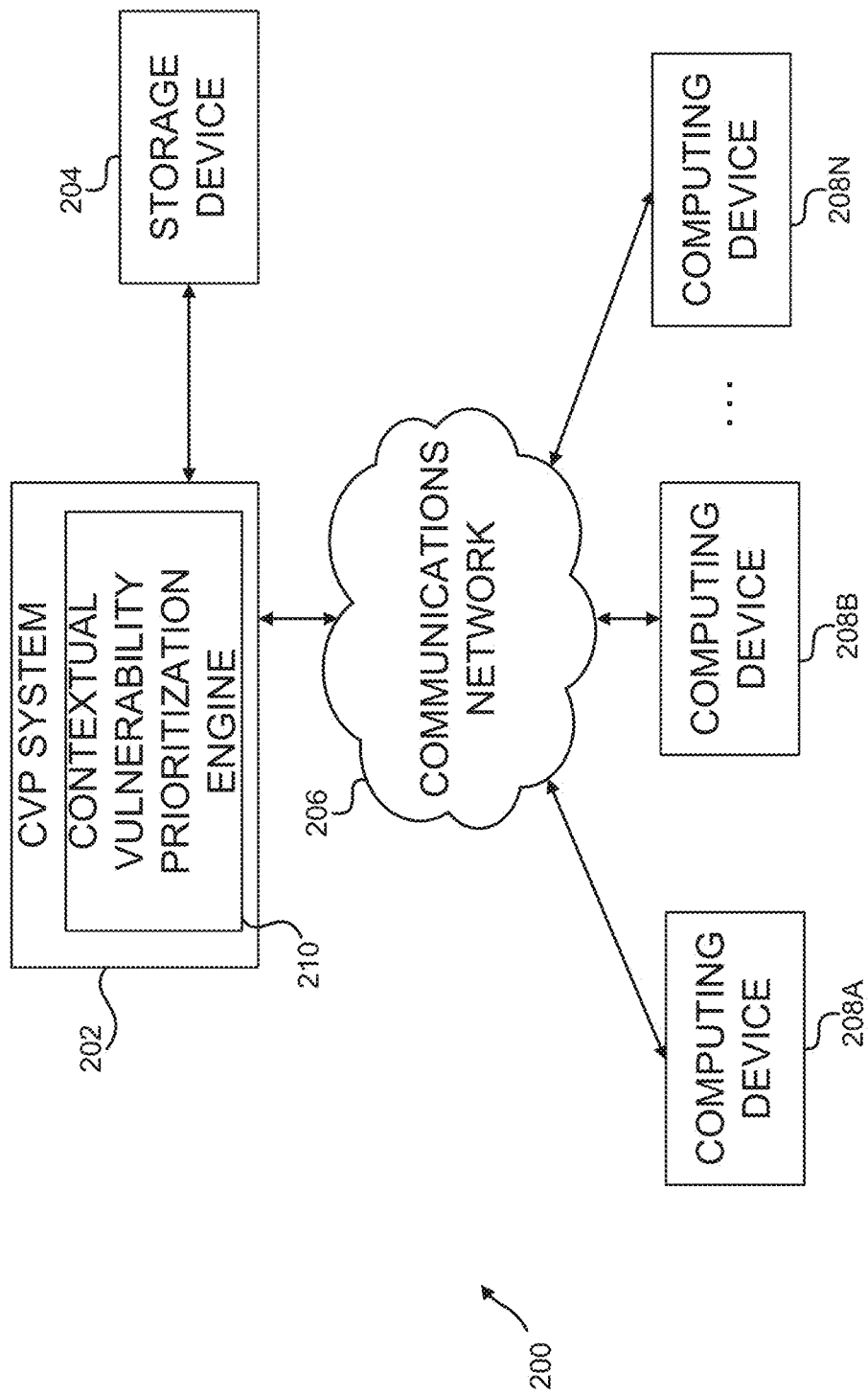
FIG. 2A and FIG. 2B are schematic diagrams of systems for dynamically scoring vulnerabilities, according to one aspect of the present disclosure.
Figure 2B:
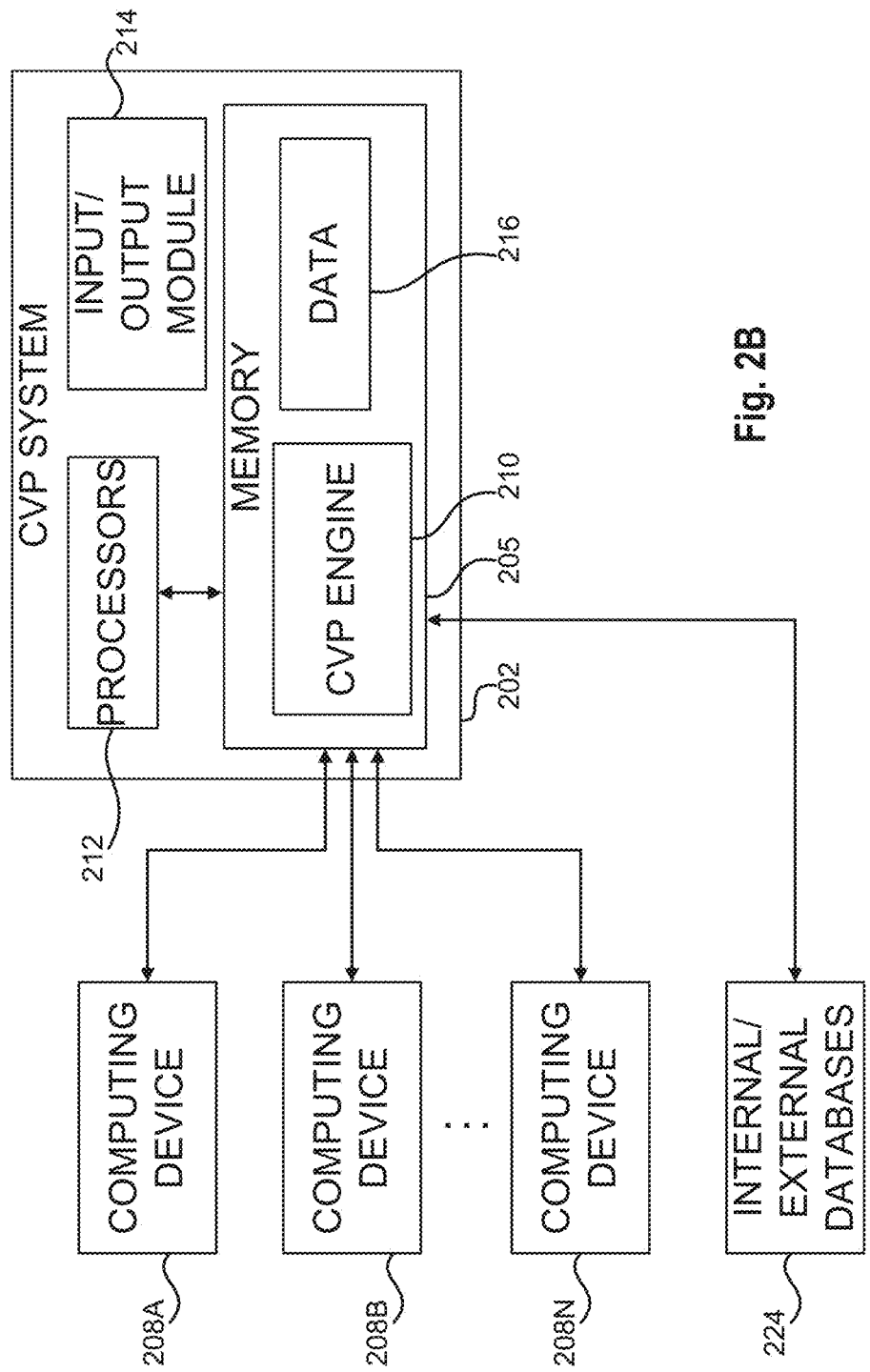

FIG. 2A and FIG. 2B are schematic diagrams of systems for dynamically scoring vulnerabilities, according to one aspect of the present disclosure. Turning first to FIG. 2A, a system 200 to generate scores and dynamically update scores for new and updated vulnerabilities is illustrated. Such a system 200 may include a vulnerability and detection response (CVP) system 202. The CVP system 202 may connect, via a communications network 206, to one or more computing devices (e.g., computing device 208A, computing device 208B, and up to computing device 208N). The CVP system 202 may additionally connect to a storage device 204.

The CVP system 202 may include a CVP engine 210. The CVP engine 210 may be comprised of software, firmware, hardware (e.g., circuitry, integrated circuits, etc.), or some combination thereof. The CVP engine 210 further may be comprised of or include instructions or programming that, when executed, may cause the CVP engine 210 to perform different functions. For example, an instruction, when executed, may cause the CVP engine 210 or a processor to scan for vulnerabilities present on the network and for occurrence of events relating to such vulnerabilities. The scan may include transmitting, via the communications network 206, a message to each computing device 208A, 208B, 208N to cause each computing device 208A, 208B, 208N to determine whether a vulnerability has been discovered or added. For example, the scan may include scanning or reading a particular storage device or a port of each computing device 208A, 208B, 208N to determine whether a vulnerability has been discovered at and/or added to a specified location (e.g., a storage device associated with or port of the computing device 208A, 208B, 208N). For example, the CVP engine 210 may scan a computing device or other device to determine whether the computing device or other device includes or has installed outdated software and/or applications, has misconfigured software and/or applications, and/or whether the computing device or other device may become vulnerable based on some data point or feature/factor. In some embodiments, such scanning can include internal scanning in accordance with programming configured to search individual connected devices. In another embodiment, the instruction(s), when executed, may cause the CVP engine 210 to detect a vulnerability in a similar manner.

In yet other embodiments, the CVP system 202 may include a user interface or the CVP system 202 may connect to a user interface. The user interface may be configured such that a user may input data to be transmitted to the CVP system 202 or the storage device 204. Such user access and searching also can be used in embodiments to aid in prioritizing vulnerabilities, e.g. create a trigger for what assets/ events may be of higher importance for allocation of resources. For example, a user, such as a security agent or expert, may enter a vulnerability and related data into the CVP system 202 via the user interface. Such related data input (e.g., how assets are tagged or classified) into the CVP system 202 may be utilized to determine the CPS and/or partial CPS. In embodiments, the CVP system 202 may detect or discover new or updated vulnerabilities (and data related thereto, such as a CVSS score, definitional information, etc. . . . ) from external sources (e.g. external from the system 200 or CVP system 202, such as external databases, National Vulnerability Database (NVD), or Bugtraq, etc.) or internal sources (e.g., internal to the system 200, such as security specialists, internal databases, or repositories, etc.).

The CVP engine 210 may further include instructions, that when executed, may cause the CVP engine 210 to score a new or updated vulnerability that has been discovered, detected, received, or input. In an embodiment, when a vulnerability is discovered, detected, received, or input, the vulnerability may include data corresponding to the vulnerability. Such data may include contextual features or data corresponding to one or more of the one or more computing devices 208A, 208B, 208N, and/or other data (e.g., such as a CVSS and other related data from NVD and/or other security data repositories or contextual features or data from internal sources). The CVP engine 210 may include one or more agents. Each of the one or more agents may correspond to one of one or more data types of the data corresponding to the vulnerability. Each of the one or more agents may utilize such corresponding data to generate a partial CPS.

The partial CPS's may be weighted, by the one or more agents or other instructions or algorithms, based on the data type corresponding to the partial CPS. The partial CPS's may then be combined or incorporated in another way to generate an overall CPS for the corresponding or associated vulnerability. For example, the partial CPS may be generated as a risk, number, and/or other indicator. The risk, number, and/or other indicator may be applied (e.g., by multiplication or via other formula, determination, or calculation) to the previous CPS resulting in a new CPS. The new CPS may then replace the previous CPS for a particular vulnerability.

For example, the CPS may be computed or determined recursively. In such examples, the CVP engine 210 may utilize the CVSS as a basis to initially generate or determine the CPS and may successively apply each generated or determined partial CPS to the current CPS.

In an embodiment, each partial CPS (e.g., a component or part of the final CPS) may be considered a factor in the mathematical formula to determine the CPS. Such a mathematical formula may be defined in a plurality of ways. For example, the CVP engine 210 may multiply the current CPS (e.g., initially the base score or CVSS) with each partial CPS to determine or generate the new CPS. In other embodiments, a weighted sum of the partial CPS may also be utilized, with the value of the weights determined by the "importance" of each or emphasis placed on each agent. These weights could also be learned using machine learning techniques, for example.

In another embodiment, the final CPS may be determined or computed by successively multiplying the factors with renormalization, in order to keep the score interval fixed, regardless of the number of factors. While the multiplication of factors may enable composability, the renormalization is done at each assessment step (e.g., determination of and incorporation of a partial CPS) and across all vulnerabilities. Such nonlinearity may allow for consistency (e.g., a fixed scale) at each step, and may also allow all vulnerabilities to influence each other vulnerability. In practice, such processes may drive the score of lower risk or less "important" vulnerabilities down and may push the score of higher risk or more "important" vulnerabilities up.

The initial step of forming the base CVSS score may be considered an uninformed prior and/or a context-free measure of risk. The uncertainty around the base score as a priority risk score may be high. In other words, the true risk could be higher or lower depending on the context related to various aspects of the vulnerability. The successive aggregation of each assessment may reduce "fuzziness" or uncertainty around the true risk. Such a process may converge or cause convergence of a final CPS towards a much narrower band of uncertainty.

The term "Common Vulnerability Scoring System" (CVSS) is used to refer to a free and open industry standard, identifying vulnerabilities by a score between 0 and 10 and other individual metrics, used for assessing the severity of security vulnerabilities. The CVSS identifies a number of metrics or characteristics to gauge the severity of a vulnerability. Each new vulnerability published includes a CVSS score. The term "Bugtraq" is used to refer to a specified electronic mailing list dedicated to computer security issues. While a specified electronic list is described, such an example is not limiting, and it will be understood that other mailing lists, as well as other community forums and/or social media posts or forums.

In an embodiment, a vulnerability may not include or be associated with a published CVSS score, or there may be a discrepancy between the published score and a projected or estimated CVSS score from the CVP engine, in which case the CVP engine can create a base CVSS score. In such examples, the CVP system 202 and/or CVP engine 210 may determine and/or generate a base CVSS score. In a further, example, the CVP system 202 and/or CVP engine 210 may determine such a CVSS score based on an objective factor or characteristic of a vulnerability (e.g., type of vulnerability, etc.) and/or based on user input (e.g., a user enters a CVSS score). In other cases, the CVSS score could be generated/calculated manually.

Once a CPS is generated for any known vulnerabilities, the CVP engine 210 or CVP system 202 will utilize this CPS for prioritizing use of network/computing resources to addressing events occurring with respect to each of the known or detected vulnerabilities present on the network. For example, vulnerabilities with a lower CPS can be viewed as lower risk than those with higher CPS/risk and resources (e.g., analyst time) can be allocated accordingly. The CVP engine 210 or CVP system 202 may transmit the CPS to each of the one or more computing devices 208A, 208B, 208N, or to a user interface for display, thereby prioritizing determining solutions for vulnerabilities. The CPS, as noted, may be displayed, via the CVP system 202, on a connected user interface. Such a user interface may display each CPS for each of the one or more vulnerabilities as a list or in other graphical formats. Such a list or other graphical formats may be shown in such a way as to emphasize and/or prioritize vulnerabilities with a higher CPS.

The CVP engine 210 may include instructions, which when executed, detect or discover events and/or data generated by the one or more computing devices 208A, 208B, 208N via events related to any of the one or more vulnerabilities. Such events may include, for example, network mapping, asset (e.g., a computing device 208A, 208B, 208N, storage location, specified or pre-selected file or component) scanning, web application scanning, web site scanning, external source scans or detections, threat intelligence events (e.g., is an asset exposed, is a known threat linked, is an exposed asset isolated, etc.), and/or so on. In response to an event occurring or being performed, data may be generated. The data may be detected by, discovered by, and/or transmitted to the CVP engine 210. The CVP engine 210 may then utilize one or more of the one or more agents corresponding to a data type of the detected, discovered, and/or transmitted data. The utilized one or more agents may each generate a partial CPS. Each partial CPS may be weighted by the corresponding agent, the CVP engine 210, and/or other algorithm or instructions included in the CVP system 202 or CVP engine 210. Each partial CPS may be integrated or incorporated into the previous CPS. The new and/or updated CPS may be transmitted to each computing device 208A, 208B, 208N and/or displayed via a user interface.

In an embodiment, the events may occur and/or be detected continuously, substantially continuously, or at selected time periods on any of the one or more computing devices 208A, 208B, 208N. In an embodiment, different events may occur at different and/or varying times on one or more of the one or more computing devices 208A, 208B, 208N. The number of events occurring at any given time may be a large amount, such as hundreds, thousands, millions, or even more. As such, each CPS corresponding to a plurality of vulnerabilities may be updated frequently. The events may occur or be executed for a particular vulnerability continuously, substantially continuously, or at selected time periods for a selected time interval. The time interval may be defined by a time that the particular vulnerability impacts a computing devices 208A, 208B, 208N. In other words, once a solution for the particular vulnerability has been determined and implemented, then events corresponding to that particular vulnerability may cease being detected and/or executed.

The contextual data may include data related to how a vulnerability impacts a computing device 208A, 208B, 208N, an asset, a network, and/or other devices or components. Each different contextual data may be weighted differently than other contextual data. For example, contextual data may include vulnerability properties (e.g., vulnerability detection reliability, exploitability confidence, cross-site scripting (XSS) protections and misconfigurations, etc.), asset context (e.g., scan frequency, availability requirements, asset importance, tagging scheme, public accessibility, user access, software recognizability, service recognizability, unusual services, unusual port/service combination, unusual software, common database exposure services, common remote administration services, website attack surface, website size, number of websites hosted by a server, operating system (OS) classification/importance, scan information date, etc.), network context (e.g., an asset stands out, simulated path of attacks search, probable path of attack found via simulation, etc.), organization context (e.g., organizational importance, vulnerability exposure within timeframe for effective remediation, detection reliability, false positive prediction, etc.), and/or external context (e.g., trusted exploits and the type of exploits of available, vulnerability trending, remote exploit available, denial of service exploit available, web application exploits available, exploits using local access, uncategorized exploits available, cited in vulnerability and/or threat intelligence tools, etc.). In another embodiment, the contextual data may include payload analysis, exploitation ease, detection reliability, threat intelligence, content is linked to known malware, and/or vulnerability trends. Further, the contextual data may include one or more of exposure data, software and services affected by the vulnerability, behavioral analytics related to vulnerability, website content, scan frequency, a network attack surface, a pivotal potential, an outstanding asset detection, or a remediation time.

As noted, the CVP engine 210 may include one or more agents. Each agent may correspond to one or more types of the contextual data. For example, when determining a partial CPS based on whether a server stands out from a network context, an agent including a machine learning algorithm may be utilized to identify outlier assets based on meta-characteristics of the assets (e.g., services, OS, ports, etc.). The machine learning algorithm may generate a partial CPS based on the identified characteristics. In another example, a number of simulated paths of attacks may be generated and probabilistically ranked to determine, via an agent, which assets are most likely to be targeted. In such examples, the agent may generate a partial CPS based on the probabilistic ranking. In yet another example, the CVP engine 210 may monitor mention or trending of a vulnerability on social networks, dark web forums, users involved in security (e.g., security agents and/or specialists). The CVP engine 210 may analyze any textual data found in relation to the vulnerability (e.g., discussion in the security community, topics mapped to vulnerabilities, etc.) via, for example, a natural language processing model. The natural language processing model may produce or generate a number representing a partial CPS, the partial CPS, in this case, representing the context of discussion relating to the vulnerability.

FIG. 2B is schematic illustration of another configuration or non-limiting example embodiment of the CVP system 202 configured to generate a CPS for a new or updated vulnerability and to dynamically update the CPS using contextual features or data from one or more events occurring substantially continuously, continuously, or at pre-selected time periods, according to one aspect of the present disclosure. The CVP system 202 of FIG. 2B may be implemented in or by the information handling system 10 of FIG. 1. The CVP system 202 may include a CVP engine 210 running on one or more processors 212, an input/output module 214, and/or a memory 205. In such embodiments, the CVP engine 210 may be comprised of instructions stored in the memory 205. As noted and in other examples, the CVP engine 210 may be comprised of the circuitry, sub-circuitry, modules, sub-modules, and/or other hardware of the CVP system 202. The CVP engine 210 may utilize data 216 stored in the memory 205, such as the contextual features or data, a CVSS score, and/or other data corresponding to one or more vulnerabilities. The CVP engine 210 may connect to various internal or external databases 224, repositories, or data sources.

Figure 3:
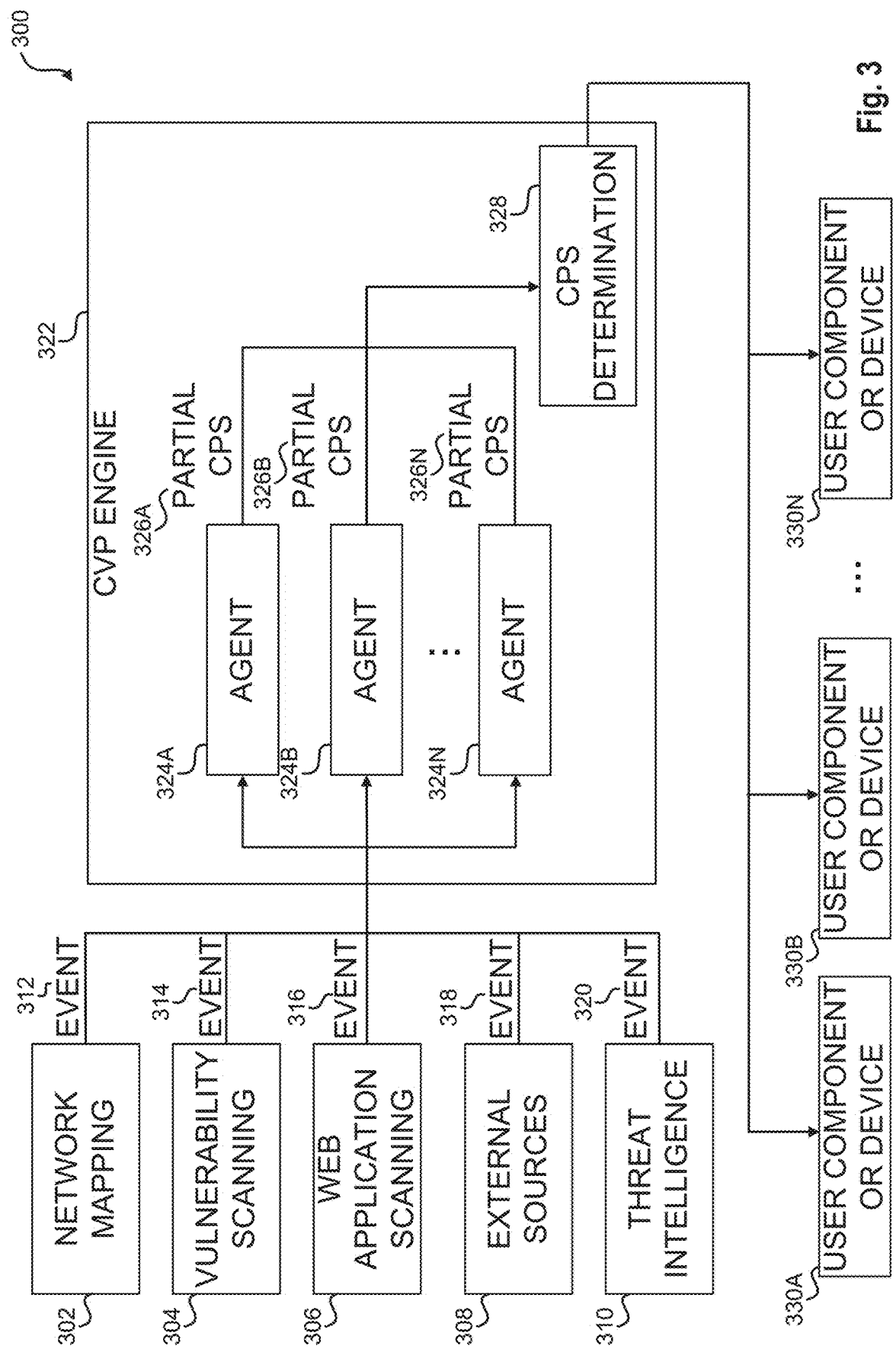
FIG. 3 is a schematic diagrams of a system for dynamically scoring vulnerabilities, according to one aspect of the present disclosure.

FIG. 3 is a schematic diagrams of a system for dynamically scoring vulnerabilities, according to one aspect of the present disclosure. The system 300 may include a CVP engine 322. The CVP engine 322 may be or may be included in a system (e.g., the CVP system 202 of FIG. 2A and FIG. 2B), computing device, and/or information handling systems 14. The CVP engine 322 may include one or more agents (e.g., agent 324A, agent 324B, etc., up to agent 324N). Each agent 324A, 324B, 324N may comprise an algorithm. The algorithm may be a trained machine learning algorithm or classifier (e.g., a supervised or unsupervised machine learning algorithm), a probabilistic model, a statistical model, or other model or classifier suitable to receive a type of data as an input and generate, based on the input, a partial CPS (e.g., partial CPS 326A, partial CPS 326B, and up to partial CPS 326N). In an embodiment, additional agents may be added to the CVP engine 322 based on the detection of new types of data. The CVP engine 322 may additionally include a module or circuitry to determine a CPS (e.g., CPS determination 328).

In an embodiment, for each vulnerability on the network, the CVP engine 322 may determine a CPS therefore by using a CVSS score. In another embodiment, the initial CPS may be generated using the CVSS and the partial CPS's 326A, 326B, 326N from the agents 324A, 324B, 324N. In an embodiment, an updated CPS may be determined on an ongoing basis based on collection of data related to one or more events 312, 314, 316, 318, 320 associated/related to each vulnerability.

The CVP engine 322 may receive data corresponding to or generate data corresponding to one or more events 312, 314, 316, 318, 320 from one or more different devices, routines, algorithms, computing devices, and/or other computing devices external to the CVP engine 322. For example, the CVP engine 322 may perform a network mapping on computing devices or other devices within a network or cloud environment. The network mapping 302 may generate an event 312 corresponding to one or more vulnerabilities.

Such an event 312 may include data, the data including, but not limited to, whether a server significantly stands out from its network context (e.g., whether a server or use of a server is an outlier in relation to typical and/or previous use) and simulated paths of attacks on the network, among other network related data. In some embodiments, a computing device may utilize vulnerability scanning 304 to provide an event 314 including various vulnerability properties. In other embodiments, the vulnerability properties may include data, data including but not limited to, the reliability of vulnerability detection, exploitability confidence, and protections and the protections configurations, among other data.

In another example, a computing device, e.g., via an application and/or local agent or diagnostics program, or the CVP engine 322 may utilize web application scanning 306 to provide an event 316 including website vulnerability context and/or asset context. The website vulnerability context and/or asset context may include data, the data including but not limited to scan frequency, availability requirements, asset or website importance, tagging scheme (e.g., does a tag deviate or stand out from a majority of other tags for an asset or does an asset include many user defined tags), public accessibility, recognizable software used, recognizable services used, unusual services found, unusual software found, unusual port/service combination found, website attack surface, website size, and whether a server hosts a website and how many, among other data. In such examples, the event 316 may describe attack surface potential information for a new CPS computation or determination (e.g., using a determined partial CPS).

Additionally, a computing device or the CVP engine 322 may utilize external sources 308 to obtain an event 318 including external data context. The external data context may include data such as whether exploit actions of the vulnerability are available, whether a vulnerability or topics related to a vulnerability are trending or discussed in an online community or social media, and whether security tools mention the vulnerability, among other data. In another example, a computing device, security tool, or the CVP engine 322 may utilize threat intelligence tools 310 to obtain an event 320 including threat intelligence data. The threat intelligence data may include data, the data including but not limited to threat intelligence data related to one or more vulnerabilities, among other data.

If more than one vulnerability corresponds to one or more of the events 312, 314, 316, 318, 320, then the data generated by each event 312, 314, 316, 318, 320 corresponding to one or more vulnerabilities, directed to each of the agents 324A, 324B, 324N assigned to or associated with one or more data types for a particular vulnerability. In such embodiments, each agent 324A, 324B, 324N may generate a partial CPS 326A, 326B, 326N in parallel and/or at varying times. In embodiments, the CVP engine 322 may scan various computing devices or other devices for occurrences of the events 312, 314, 316, 318, 320.

Once one or more partial CPS's 326A, 326B, 326N have been determined, each partial CPS 326A, 326B, 326N may be utilized to determine a CPS via the module or circuitry to determine the CPS (e.g., CPS determination 328). The CPS determination 328 may utilize an aggregation or calculation that is based upon previous CPS and one or more partial CPS 326A, 326B, 326N to determine a new CPS. Each partial CPS 326A, 326B, 326N may be utilized as a factor for the new CPS. In another embodiment, any new partial CPS's 326A, 326B, 326N may replace previous partial CPS's forming the total previous CPS. The new CPS may replace the previous CPS for a particular vulnerability. In some embodiments, the new CPS can be discarded or can replace the existing CPS depending on a determination as to whether to new CPS differs from the existing CPS by a selected threshold value.

Once a new CPS has been determined, the new CPS may be transmitted to one or more user components or devices 330A, 330B, 330N, computing devices, user interfaces, and/or other devices or components for display. The new CPS may also be utilized to generate another new CPS in response to generation of any new partial CPS's. In addition, upon generation of the new CPS, the new CPS may be stored in memory, a storage device, and/or a database. Data indicating a particular vulnerability may be included with the new CPS. The data used to generate the new CPS may be stored with the new CPS, as well.

Figure 4:
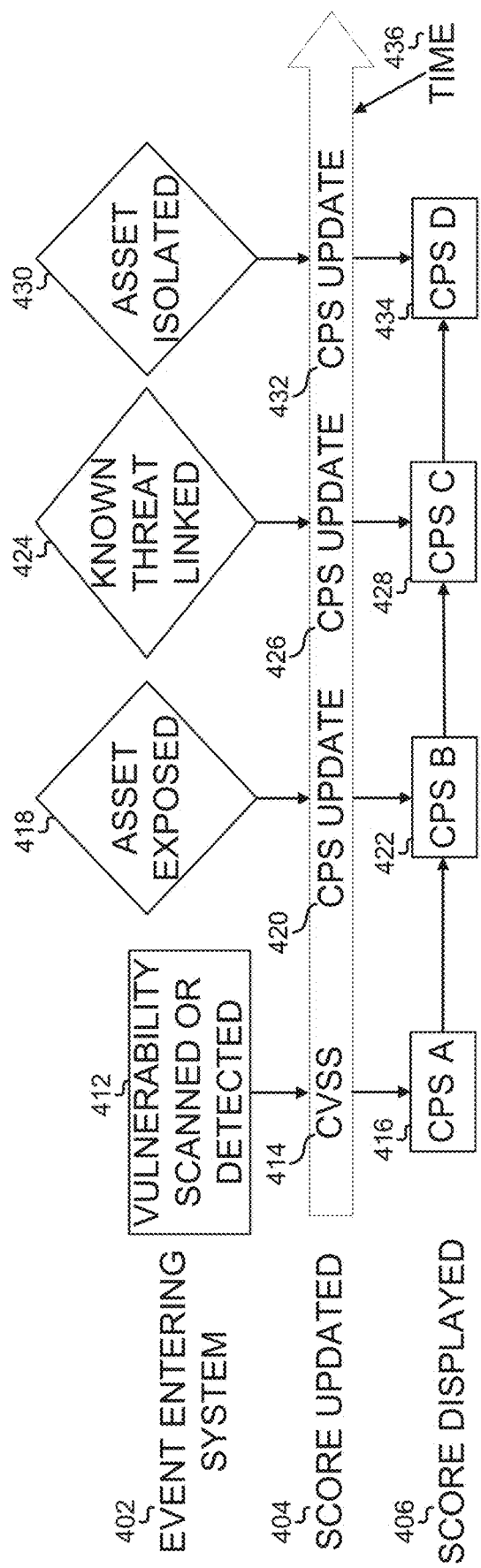
FIG. 4 is an example of a method/process for dynamic vulnerability scoring, according to one aspect of the present disclosure.

FIG. 4 is an example of a method/process for dynamic vulnerability scoring, according to one aspect of the present disclosure. Three actions are illustrated in relation to time 436 in such a method. The three actions include an event entering the system 402, a score being updated 404, and a score being displayed 406. While three actions are illustrated, the method is not limited to such actions and the method may include additional types of actions. The system described in relation to FIG. 4 may include the information handling system of FIG. 1, the CVP system of FIGS. 2A and 2B, and/or the CVP engine of FIG. 3.

In an embodiment, an event may enter the system at block 412. At block 412, a vulnerability may be detected or scanned. Data associated with and/or corresponding to the vulnerability may enter the system during such a scan or detection. The data may include a CVSS. The vulnerability may include any vulnerability that affects a computing device, such as an exploit or a way or process to take advantage of a vulnerability, a change to outdated or misconfigured software and/or computing devices or other devices, a compromised IP address indicating that a threat has been materialized (e.g., such as via a weak password,) a foreign file on an unprotected website, and so on. At 414, the CPS may be determined. The CPS, at least for the first generation, may be the CVSS. In another embodiment, additional data may be included in such a generation or determination, such as contextual features or data and/or other historical data corresponding to the vulnerability. Once a CPS has been determined, the CPS (e.g., CPS A 416) may be displayed to a user or stored in memory, a storage device, and/or database, in addition to data identifying the vulnerability.

At block 418, an event may enter the system indicating that an asset is exposed. Depending on the type of asset (e.g., public/private, accessible/not accessible, important/not important, etc.), an agent may determine a partial CPS and incorporate the partial CPS into the previous CPS (e.g., from 414) at the CPS update 420. The new CPS (e.g., CPS B 422) may then be displayed and may replace the previous CPS at the memory, a storage device, and/or database.

At block 424, an event may enter the system indicating that a known threat has been linked. In other words, a known threat has been linked to a particular asset (e.g., indicating the asset is being attacked or targeted). Depending on the type of threat, an agent may determine a partial CPS and incorporate the partial CPS into the previous CPS (e.g., from 420 and 422) at the CPS update 426. The new CPS (e.g., CPS C 428) may then be displayed and may replace the previous CPS at the memory, a storage device, and/or database.

At block 430, an event may enter the system indicating whether an asset is isolated. Depending on accessibility of the asset, an agent may determine a partial CPS and incorporate the partial CPS into the previous CPS (e.g., from 426 and 428) at the CPS update 432. The new CPS (e.g., CPS D 434) may then be displayed and may replace the previous CPS at the memory, a storage device, and/or database.

Other events may enter a system at any time (e.g., in parallel or sequentially). For example, additional events indicating that other assets have been exposed may be received. Corresponding CPS's may be updated based on received contextual data. Once a partial CPS score is determined the previous CPS may be updated and replaced. While the events entering the system in FIG. 4 are illustrated as entering the system in sequential order, such examples are not limiting and it will be understood that events may enter at many different times, at the same time, or some combination thereof.

Figure 5:
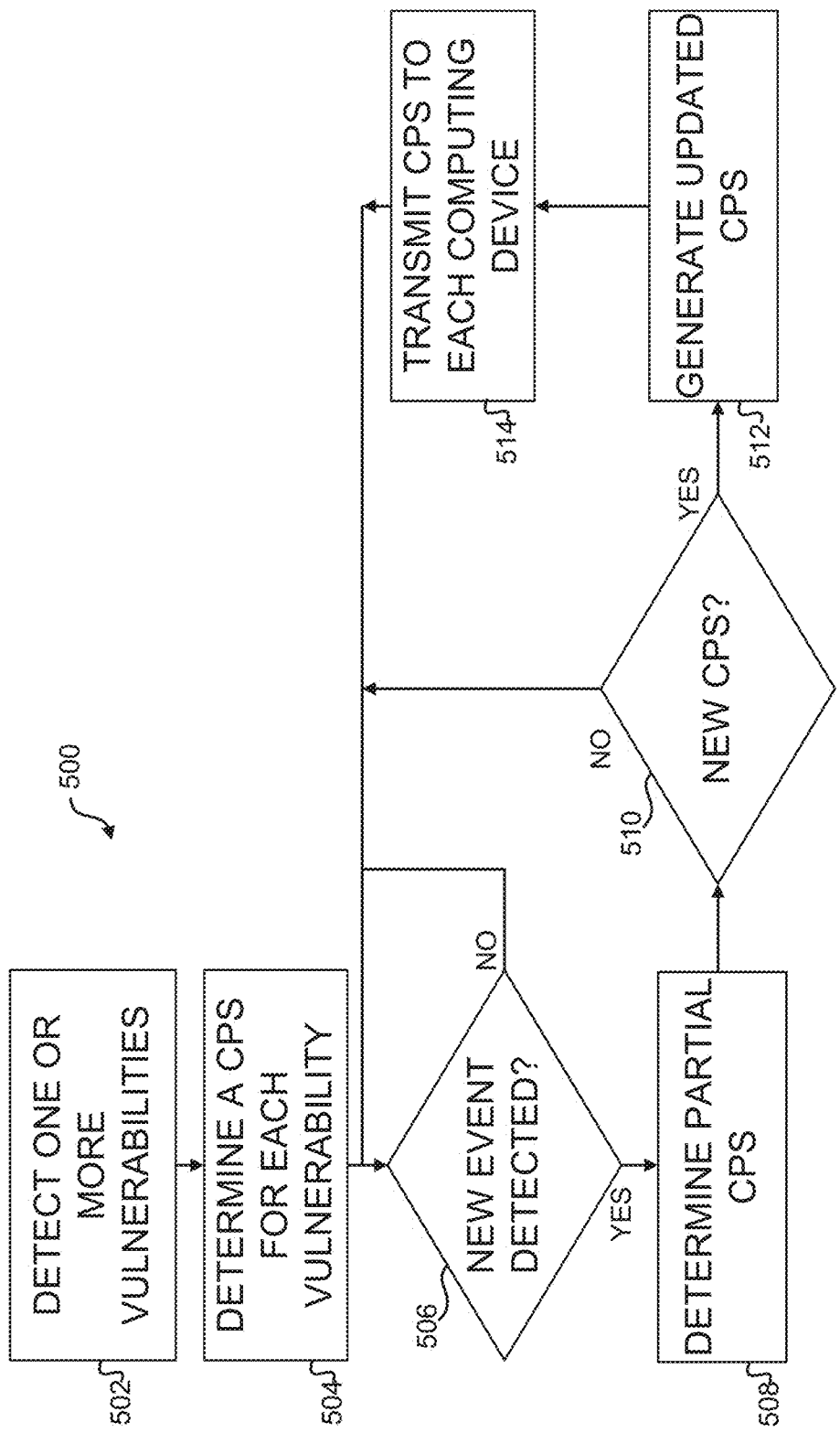
FIG. 5 and FIG. 6 are methods/processes for dynamic vulnerability scoring, according to aspects of the present disclosure.

FIG. 5 illustrates a method/process for dynamic vulnerability scoring, according to one aspect of the present disclosure. It also will be understood that any of the Figs. described herein may implement the method 500, in particular FIGS. 1-3. The order in which the operations are described is not intended to be construed as a limitation, and any number of the described blocks may be combined in any order and/or in parallel to implement the disclosed methods.

At block 502, one or more vulnerabilities may be detected or scanned. A CVP system (e.g., information handling system 14/22, CVP system 202, and/or CVP engine 322) may scan for such vulnerabilities or may receive such vulnerabilities from one or more different computing devices or users (e.g., via a user interface). In another embodiment, the CVP system may scan external data sources for new or updated vulnerabilities. In yet another embodiment, detection of the vulnerabilities may be a continuous, ongoing process.

At block 504, once a vulnerability has been detected, received, or discovered by the CVP system, the CVP system may determine a CPS for each detected, received, or discovered vulnerability. In an embodiment, the initial CPS may be based on a CVSS of the vulnerability. In another embodiment, in addition to receiving a CVSS when the vulnerability is received, the CVP system may receive historical data. The historical data may include one or more contextual features or data related to the vulnerability. In such an embodiment, the CPS may be based on one or more partial CPS's generated for each of the one or more contextual features. Each partial CPS may be generated by one or more corresponding agents of the CVP system.

At block 506, the CVP system may scan for new events from one or more computing devices or other devices. The CVP system may scan continuously, substantially continuously, or at pre-selected time periods. In another embodiment, rather than scan for new events, the CVP system may wait until a new event is received. In such embodiments, the CVP system may be in communication with one or more computing devices or other devices. When an event is generated at the one or more computing devices or other devices, the event may then be transmitted, along with corresponding data, to the CVP system.

At block 508, the CVP system may determine a partial CPS based on data received corresponding to the event. In an embodiment, based on the type of data received and/or the context of the data received, the CVP system may generate a factor. The factor, in such embodiments, may be considered the partial CPS as needed. The partial CPS or factor may be utilized by the CVP system to generate a new, updated CPS. For example, if a factor is utilized for the partial CPS, the new factor may be applied to the current CPS to generate the new CPS. In addition, in embodiments, the new partial CPS can be weighted or compared to an existing partial CPS for such factor, and If it is found to differ by a selected threshold, the new CPS can be applied.

At block 510, the CVP system may determine whether a new CPS is different than the previous or current CPS. In another embodiment, the CVP system may determine whether the partial CPS is different than the previous partial CPS. In either embodiment, if no difference is detected, then the CVP system may continue to scan or may wait until a new event is detected or received.

At block 512, if a difference is detected at block 510, the CVP system may generate the updated CPS. As described above, if the partial CPS is a factor, then the factor may be applied to the previous CPS. Other values or types of partial CPS's may be incorporated into or applied to the previous CPS. At block 514, the CVP system may transmit the new CPS to each computing device or other device. In another embodiment, the new CPS may, in addition to or rather than transmitting the new CPS to each computing device or other device, be stored in memory, a storage device, and/or a database. The CVP system may also display the new CPS on a user interface.

Figure 6:
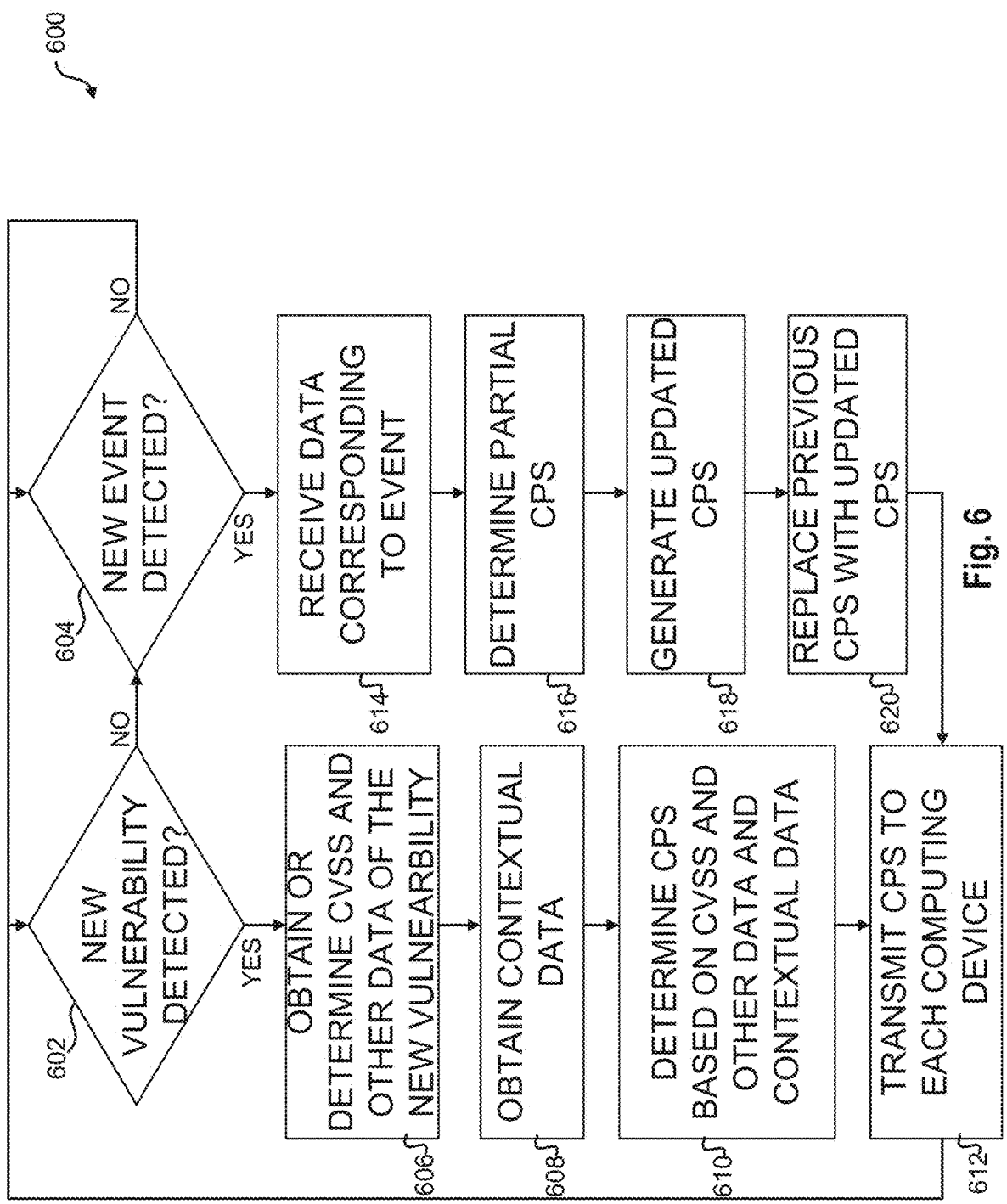

FIG. 6 is a method/process for dynamic vulnerability scoring, according to one aspect of the present disclosure. It also will be understood that any of the Figs. described herein may implement the method 600, in particular FIGS. 1-3. The order in which the operations are described is not intended to be construed as a limitation, and any number of the described blocks may be combined in any order and/or in parallel to implement the disclosed methods.

At block 602, a CVP system may scan for new vulnerabilities. one or more vulnerabilities may be detected. A CVP system may scan for such vulnerabilities or may receive such vulnerabilities from one or more different computing devices or users. In other embodiments, the CVP system may wait to receive such vulnerabilities from one or more different computing devices or users (e.g., via a user interface). In yet another embodiment, the CVP system may scan external data sources for new or updated vulnerabilities.

At block 604, the CVP system may scan for new events from one or more computing devices or other devices. The CVP system may scan continuously, substantially continuously, or at pre-selected time periods. In another embodiment, rather than scan for new events, the CVP system may wait until a new event is received. In such embodiments, the CVP system may be in communication with one or more computing devices or other devices. When an event is generated at the one or more computing devices or other devices, the event may then be transmitted, along with corresponding data, to the CVP system.

At block 606, if a new vulnerability is detected, discovered, or received, the CVP system may obtain a CVSS of the new vulnerability. The CVP system may obtain other data corresponding to the new vulnerability. The other data may include historical data, contextual features or data, or other data related to the CVSS from external sources. At block 608, the CVP system may obtain contextual data or historical contextual data. At block 610, the CVP system may determine the CPS based on the CVSS, other data, and the contextual data or historical contextual data. At block 612, the CPS may be transmitted to each computing device of one or more computing devices.

If a new event is detected at block 604, at block 614, the CVP system may receive data corresponding to the new detected event, and direct different portions or types of data to corresponding or associated agents. At block 616, the CVP system may determine a partial CPS based on the data corresponding to the event and via an agent corresponding to a type of data of the data corresponding to the event. At block 618, the CVP may generate an updated CPS based on a previous CPS and the partial CPS. At block 620, the CVP system may replace the previous CPS with the updated CPS. At block 612, the updated CPS may be transmitted to each of the computing devices.

Figure 7:
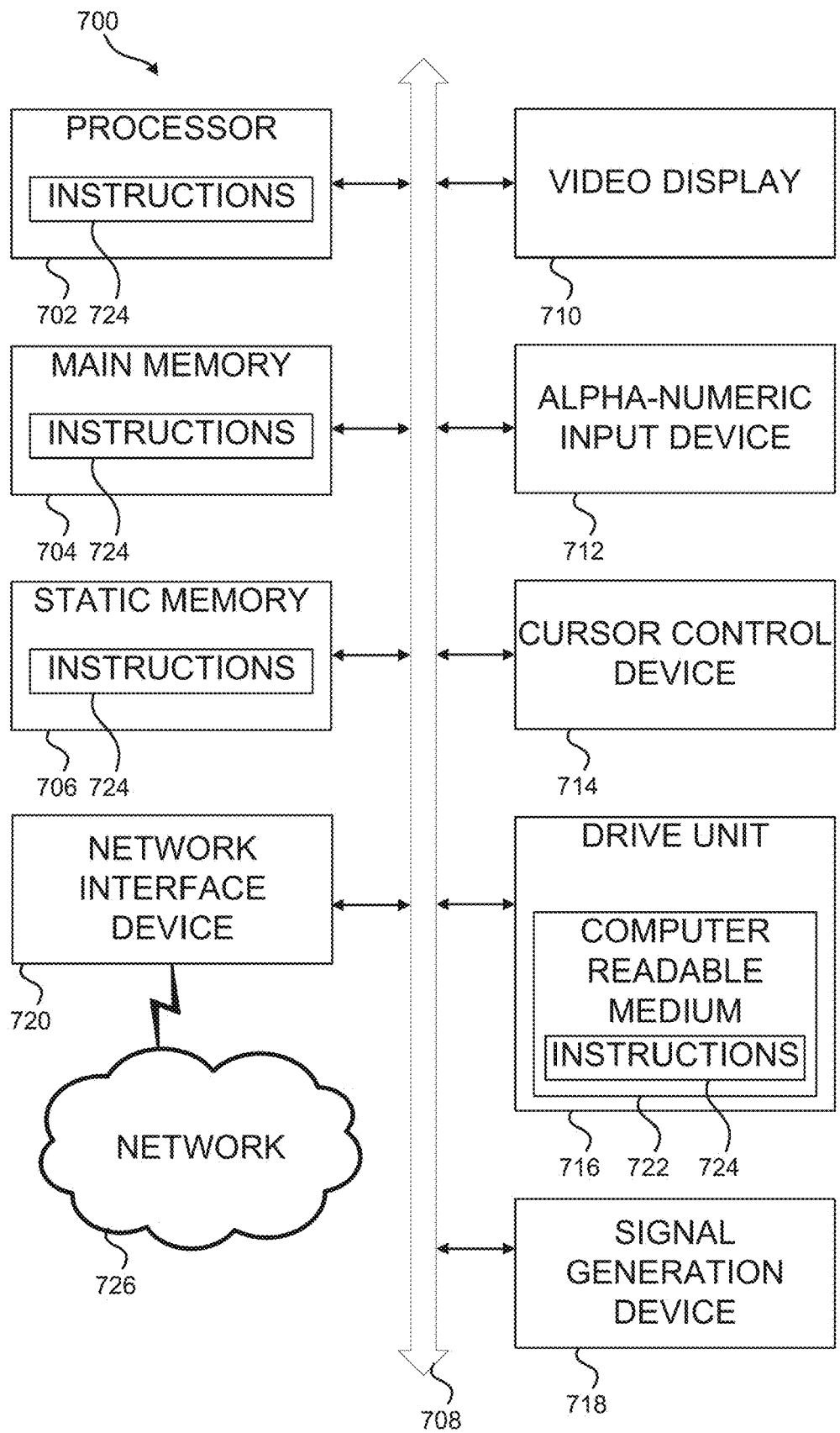
FIG. 7 is a schematic diagram of an information handling system capable of administering each of the specific embodiments, according to one aspect of the present disclosure.

FIG. 7 shows an example of an information handling system 700 capable of administering each of the specific embodiments of the present disclosure and variations thereof, including hosting the CVP engine and/or be scanned by the CVP engine. The information handling system 700 can represent the systems of FIGS. 1 through 3. The information handling system 700 may include a computer system or processor 702 such as a central processing unit (CPU), a graphics processing unit (GPU), or both. Moreover, the information handling system 700 can include a main memory 704 and a static memory 706 that can communicate with each other via a bus 708. The information handling system 700 includes near-field communications (NFC) device and interface 718, such as an antenna and NFC subsystem. The information handling system 700 can also include a disk drive unit 716, and a network interface device 720. As shown, the information handling system 700 further may include a video display unit 710, such as a liquid crystal display (LCD), an organic light emitting diode (OLED), a flat panel display, a solid state display, or a cathode ray tube (CRT), or other suitable display. The video display unit 710 may also act as an input accepting touchscreen inputs. Additionally, the information handling system 700 may include an input device 712, such as a keyboard, and a cursor control device 714, such as a mouse or touch pad, or a selectable interface on the display unit. The information handling system also may include a battery system or other backup power source, and a disk drive unit 716. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer.

The information handling system 700 can include a set of instructions that can be executed to cause the processor to perform any one or more of the methods or computer based functions disclosed herein. The processor 702 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 and/or the static memory 706 may include a computer-readable medium 722 in which one or more sets of instructions 724 such as software can be embedded, and generally will contain sufficient space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network (IEEE 802), or other network. The network interface device 720 may also interface with macrocellular networks including wireless telecommunications networks such as those characterized as 2G, 3G, 4G, 5G, LTE or similar wireless telecommunications networks similar to those described above. The network interface device 720 may be a wireless adapter having antenna systems 732 for various wireless connectivity and radio frequency subsystems 730 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 728 can communicate voice, video or data over the network 728. Further, the instructions 724 may be transmitted or received over the network 728 via the network interface device 720. In a particular embodiment, the instructions can include BIOS/FW code that resides in memory 704, and include machine-executable code that is executed by processor 702 to perform various functions of information handling system 700.

The instructions 724 operable by the information handling system 700 can include one or more application programs, and Basic Input/Output System and Firmware (BIOS/FW) code. BIOS/FW code functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in disk drive unit 716, in a ROM (not illustrated) associated with information handling system 700, in an option-ROM (not illustrated) associated with various devices of information handling system 700, in the main or static memory storage, in a storage system (not illustrated) associated with the network interface device 720 or a network channel, in another storage medium of the information handling system 700, or a combination thereof. The application programs and/or BIOS/FW code can each be implemented on the machine handling system as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored. The computer-readable medium may include "non-transitory machine-readable storage medium." In an embodiment, the non-transitory machine-readable storage medium may be used to refer to any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As described herein, the memory may store or include instructions executable by the processor.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.), or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems. The terms "processor," "processing circuitry," and "processing resources" may also refer to any one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In another embodiment, the term "computing device" or "system device" may be used to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

In another embodiment, the term "server" or "server device" may be used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A system for dynamically assessing and ranking security vulnerabilities of a selected entity including a network having a plurality of computing devices linked thereto, the system comprising:
   a hardware processor; and
   a memory coupled to the hardware processor with instructions stored thereon, that cause the hardware processor to execute a contextual vulnerability prioritization engine configured to:
   dynamically detect a vulnerability for the selected entity;
   determine a contextual prioritization score (CPS) for the vulnerability in relation to the selected entity based on an aggregation of a plurality of partial CPSs generated for each of (a) a plurality of contextual features associated with the selected entity and related to the vulnerability and (b) one or more non-contextual features related to the vulnerability;
   scan for occurrences of events related to the vulnerability on the plurality of computing devices of the selected entity;
   in response to detection of an occurrence of an event related to the vulnerability on the plurality of computing devices, direct data corresponding to a detected event related to the vulnerability to corresponding agents of a plurality of agents, wherein the directing is based on a data type of the data corresponding to the detected event;
   wherein each of the plurality of partial CPSs of each of the plurality of contextual features are dynamically computed by a corresponding agent of the plurality of agents based on the plurality of contextual features related to the vulnerability and data associated with the corresponding agent collected from the detected event;
   determine, via each corresponding agent receiving the data corresponding to the detected event, a new partial CPS for each contextual feature applicable to data corresponding to the occurrence of the detected event, wherein the plurality of agents each comprise a machine learning model that generates the new partial CPS based on the data corresponding to the detected event and the selected entity, wherein the new partial CPS for each contextual feature is weighted based on the data type of the data corresponding to the detected event during the aggregation of the plurality of partial CPSs,
   wherein the new partial CPS for each contextual feature is further weighted based on an importance of the corresponding agent;
   determine an updated CPS representative of a present state of the vulnerability in relation to the selected entity based on the new partial CPSs; and
   transmit the updated CPS to each of the plurality of computing devices.

2. The system of claim 1, wherein the plurality of agents each comprise one or more of trained classifiers, statistical models, or probabilistic models.

3. The system of claim 2, wherein the trained classifiers are generated via another plurality of additional contextual features related to the vulnerability and a plurality of additional non-contextual features related to the vulnerability and one or more of a supervised machine learning algorithm or an unsupervised machine learning algorithm.

4. The system of claim 1, wherein the plurality of computing devices include one or more of a switch, an access point, servers, storage devices, or user devices.

5. The system of claim 1, wherein the one or more non-contextual features include a common vulnerability scoring system (CVSS) score related to the vulnerability.

6. The system of claim 1, wherein the plurality of contextual features include one or more of a payload analysis, exploitation ease, detection reliability, threat intelligence, or vulnerability trends.

7. The system of claim 6, wherein the plurality of contextual features further include one or more of exposure data, software and services affected by the vulnerability, behavioral analytics related to the vulnerability, website content, scan frequency, a network attack surface, a pivotal potential, an outstanding asset detection, or a remediation time.

8. The system of claim 1, wherein the data corresponding to the detected event comprises one or more of exposure data, software and services affected by the vulnerability, behavioral analytics related to the vulnerability, website content, scan frequency, a network attack surface, a pivotal potential, an outstanding asset detection, or a remediation time.

9. The system of claim 1, wherein the contextual vulnerability prioritization engine is further configured to dynamically prioritize a plurality of vulnerabilities based on one or more dynamically updated CPSs for one or more vulnerabilities of the plurality of vulnerabilities.

10. A computer-implemented method of dynamically assessing and ranking security vulnerabilities of a selected entity including a network having a plurality of computing devices linked thereto, performed using a processing device, the method comprising:
dynamically detecting a vulnerability for the selected entity;
determining a contextual prioritization score (CPS) for the vulnerability in relation to the selected entity based on an aggregation of a plurality of partial CPSs generated for each of (a) a plurality of contextual features associated with the selected entity and related to the vulnerability and (b) one or more non-contextual features related to the vulnerability;
scanning for occurrences of events related to the vulnerability on the plurality of computing devices of the selected entity;
in response to detection of an occurrence of an event related to the vulnerability on the plurality of computing devices, directing data corresponding to a detected event related to the vulnerability to corresponding agents of a plurality of agents, wherein the directing is based on a data type of the data corresponding to the detected event;
wherein each of the plurality of partial CPSs of each of the plurality of contextual features are dynamically computed by a corresponding agent of the plurality of agents based on the plurality of contextual features related to the vulnerability and data associated with the corresponding agent collected from the detected event;
determining, via each corresponding agent receiving the data corresponding to the detected event, a new partial CPS for each contextual feature applicable to data corresponding to the occurrence of the detected event, wherein the plurality of agents each comprise a machine learning model that generates the new partial CPS based on the data corresponding to the detected event and the selected entity, wherein the new partial CPS for each contextual feature is weighted based on the data type of the data corresponding to the detected event during the aggregation of the plurality of partial CPSs,
wherein the new partial CPS for each contextual feature is further weighted based on an importance of the corresponding agent;
determining an updated CPS representative of a present state of the vulnerability in relation to the selected entity based on the new partial CPSs; and
transmitting the updated CPS to each of the plurality of computing devices.

11. The method of claim 10, wherein the plurality of agents each comprise one or more of trained classifiers, statistical models, or probabilistic models.

12. The method of claim 11, wherein the trained classifiers are generated via another plurality of additional contextual features related to the vulnerability and a plurality of additional non-contextual features related to the vulnerability and one or more of a supervised machine learning algorithm or an unsupervised machine learning algorithm.

13. The method of claim 10, wherein the plurality of computing devices include one or more of a switch, an access point, servers, storage devices, or user devices.

14. The method of claim 10, wherein the one or more non-contextual features include a common vulnerability scoring system (CVSS) score related to the vulnerability.

15. The method of claim 10, wherein the plurality of contextual features include one or more of a payload analysis, exploitation ease, detection reliability, threat intelligence, or vulnerability trends.

16. A non-transitory machine-readable storage medium that has instructions stored thereon that, responsive to execution by a processing device, cause the processing device to perform operations of dynamically assessing and ranking security vulnerabilities of a selected entity including a network having a plurality of computing devices linked thereto, the operations comprising:
dynamically detecting a vulnerability for the selected entity;
determining a contextual prioritization score (CPS) for the vulnerability in relation to the selected entity based on an aggregation of a plurality of partial CPSs generated for each of (a) a plurality of contextual features associated with the selected entity and related to the vulnerability and (b) one or more non-contextual features related to the vulnerability;
scanning for occurrences of events related to the vulnerability on the plurality of computing devices of the selected entity;
in response to detection of an occurrence of an event related to the vulnerability on the plurality of computing devices, directing data corresponding to a detected event related to the vulnerability to corresponding agents of a plurality of agents, wherein the directing is based on a data type of the data corresponding to the detected event;
wherein each of the plurality of partial CPSs of each of the plurality of contextual features are dynamically computed by a corresponding agent of the plurality of agents based on the plurality of contextual features related to the vulnerability and data associated with the corresponding agent collected from the detected event;
determining, via each corresponding agent receiving the data corresponding to the detected event, a new partial CPS for each contextual feature applicable to data corresponding to the occurrence of the detected event, wherein the plurality of agents each comprise a machine learning model that generates the new partial CPS based on the data corresponding to the detected event and the selected entity, wherein the new partial CPS for each contextual feature is weighted based on the data type of the data corresponding to the detected event during the aggregation of the plurality of partial CPSs, wherein the new partial CPS for each contextual feature is further weighted based on an importance of the corresponding agent;

determining an updated CPS representative of a present state of the vulnerability in relation to the selected entity based on the new partial CPSs; and transmitting the updated CPS to each of the plurality of computing devices.

17. The non-transitory machine-readable storage medium of claim 16, wherein the plurality of agents each comprise one or more of trained classifiers, statistical models, or probabilistic models.

18. The non-transitory machine-readable storage medium of claim 17, wherein the trained classifiers are generated via another plurality of additional contextual features related to the vulnerability and a plurality of additional non-contextual features related to the vulnerability and one or more of a supervised machine learning algorithm or an unsupervised machine learning algorithm.

19. The non-transitory machine-readable storage medium of claim 16, wherein the plurality of computing devices include one or more of a switch, an access point, servers, storage devices, or user devices.

20. The non-transitory machine-readable storage medium of claim 16, wherein the one or more non-contextual features include a common vulnerability scoring system (CVSS) score related to the vulnerability.

\* \* \* \* \*